(12) United States Patent
Shao et al.

(10) Patent No.: US 9,769,845 B2
(45) Date of Patent: Sep. 19, 2017

(54) METHOD FOR GROUP SCHEDULING GRANT, USER EQUIPMENT AND RADIO NETWORK CONTROLLER

(71) Applicant: Huawei Technologies Co., Ltd., Shenzhen (CN)

(72) Inventors: Jiafeng Shao, Shenzhen (CN); Xueli Ma, Shenzhen (CN); Bingzhao Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 131 days.

(21) Appl. No.: 14/717,263

(22) Filed: May 20, 2015

(65) Prior Publication Data
US 2015/0282209 A1 Oct. 1, 2015

Related U.S. Application Data

(63) Continuation of application No. PCT/CN2012/084894, filed on Nov. 20, 2012.

(51) Int. Cl.
*H04L 12/26* (2006.01)
*H04W 4/00* (2009.01)
(Continued)

(52) U.S. Cl.
CPC .......... *H04W 72/14* (2013.01); *H04L 1/1812* (2013.01); *H04W 72/121* (2013.01); *H04W 88/02* (2013.01); *H04W 88/12* (2013.01)

(58) Field of Classification Search
CPC ..... H04L 1/1812; H04L 1/1887; H04L 41/12; H04W 24/00
See application file for complete search history.

(56) References Cited

U.S. PATENT DOCUMENTS

2007/0115871 A1\* 5/2007 Zhang ................ H04W 52/346
370/318
2007/0183359 A1 8/2007 Chen et al.
(Continued)

FOREIGN PATENT DOCUMENTS

| CN | 1917447 A | 2/2007 |
| WO | WO 2008024340 A2 | 2/2008 |
| WO | WO 2008040710 A1 | 4/2008 |

OTHER PUBLICATIONS

"Considerations to the support of Per-HARQ process grants," 3GPP TSG-RAN WG2, Meeting #75, Athens, Greece, Tdoc R2-114078, 3rd Generation Partnership Project, Valbonne, France (Aug. 22-26, 2011).

(Continued)

*Primary Examiner* — Melanie Jagannathan
(74) *Attorney, Agent, or Firm* — Leydig, Voit & Mayer, Ltd.

(57) ABSTRACT

The present invention provides a method for group scheduling grant, a user equipment and a radio network controller. The method for group scheduling grant includes: reporting, by a UE, to an RNC a capability of the UE to support an uplink enhanced dedicated channel; receiving a configuration message transmitted by the RNC, where the configuration message carries an E-RNTI; where the E-RNTI carried in the configuration message includes an E-RNTI allocated to a group to which the UE belongs; monitoring, by the UE, a first channel by using the E-RNTI carried in the configuration message, and activating or deactivating an HARQ process according to an absolute grant received by the UE in the first channel. The present invention can reduce the utilization of E-AGCHs, improve the utilization efficiency of downlink code resources, and prevent the downlink throughput from being limited.

11 Claims, 11 Drawing Sheets

(51) Int. Cl.
 *H04W 72/14* (2009.01)
 *H04W 72/12* (2009.01)
 *H04L 1/18* (2006.01)
 *H04W 88/02* (2009.01)
 *H04W 88/12* (2009.01)

(56) References Cited

U.S. PATENT DOCUMENTS

| | | | |
|---|---|---|---|
| 2007/0218907 A1 | 9/2007 | Jiang | |
| 2007/0223405 A1* | 9/2007 | Jiang | H04L 1/1812 370/278 |
| 2008/0070583 A1* | 3/2008 | Tseng | H04W 52/228 455/450 |
| 2009/0196259 A1* | 8/2009 | Pani | H04W 36/0055 370/332 |
| 2010/0111023 A1* | 5/2010 | Pelletier | H04L 5/0007 370/329 |
| 2010/0113004 A1* | 5/2010 | Cave | H04W 52/365 455/422.1 |
| 2010/0130219 A1* | 5/2010 | Cave | H04W 72/02 455/450 |
| 2010/0165953 A1* | 7/2010 | Chen | H04W 72/1273 370/335 |
| 2010/0215005 A1* | 8/2010 | Pradas | H04W 74/08 370/329 |
| 2011/0007700 A1* | 1/2011 | Aminaka | H04W 72/0406 370/329 |
| 2013/0039393 A1* | 2/2013 | Choi | H04L 1/1874 375/219 |
| 2013/0142076 A1* | 6/2013 | Ramos | H04W 24/00 370/254 |
| 2013/0208668 A1* | 8/2013 | Ramos | H04W 74/0833 370/329 |
| 2013/0336231 A1* | 12/2013 | Ankel | H04W 72/1268 370/329 |

OTHER PUBLICATIONS

"3rd Generation Partnership Project; Technical Specification Group Radio Access Network; Medium Access Control(MAC)protocol specification(Release 11)," 3GPP TS 25.321, V11.2.0, $3^{rd}$ Generation Partnership Project, Valbonne, France (Sep. 2012).

* cited by examiner

METHOD FOR GROUP SCHEDULING GRANT, USER EQUIPMENT AND RADIO NETWORK CONTROLLER

CROSS-REFERENCE TO RELATED APPLICATION

This application is a continuation of International Patent Application No. PCT/CN2012/084894, filed on Nov. 20, 2012, which is hereby incorporated by reference in its entirety.

TECHNICAL FIELD

The present invention relates to the field of communications technologies and, in particular, to a method for group scheduling grant, a user equipment and a radio network controller.

BACKGROUND

With the rapid development of communications technologies, as one of the main technologies for the third generation mobile communication systems, the wideband code division multiple access (WCDMA for short) has been widely researched and applied on a global scale. At present, there are multiple WCDMA releases including the ninety-ninth release (Release 99; R99 for short), the fourth release (Release4; R4 for short), the eleventh release (Release 11; R11 for short) and etc.

In the WCDMA R6 release, optimizations and evolutions are performed for uplink packet service, and the high speed uplink packet access (HSUPA for short) technology is introduced. Similar to the HSDPA technology, the HSUPA adopts hybrid automatic repeat request (HARQ for short), fast scheduling based on a base station (Node B) and a 2 ms Transmission Time Interval (TTI for short) short frame transmission. The HSUPA makes a maximum uplink data throughput rate of a single cell achieve at 5.76 Mbit/s, which greatly enhances data service bearing capability and spectrum efficiency of the uplinks.

In the WCDMA R11 release, a TTI alignment between CELL-FACH users and cell-dedicated (CELL-DCH for short) users (TTI alignment between CELL-FACH UEs and CELL-DCH UEs) technology is introduced into properties of a enhanced cell forward access channel (CELL-FACH for short). The main spirit of this technology is to perform an alignment transmission for data block uplink subframes of the CELL-FACH users and the CELL-DCH users, so as to reduce interference between the CELL-FACH users and CELL-DCH users, thereby increasing cell throughput. In fact, this technology is a realization and an application of time-division multiple scheduling (TDM scheduling for short) under the CELL-FACH.

In the present universal mobile telecommunications system (UMTS for short) network, a market penetration rate of smartphones is becoming higher and higher, an uplink interference problem gradually emerges with the rapid growth of an amount of network data processing. Since the UMTS is a self-interference system, the uplink interference mainly results from mutual interferences among users, as proved by simulations and theoretical analysis, the TDM scheduling performed on the uplink transmission may produce large suppressions to interferences among users. Therefore, the TDM scheduling may not only be applied to CELL-FACH state, but also be extended to the CELL-DCH state in the future.

In prior art, information bits carried in an enhanced dedicated channel absolute grant channel (E-AGCH for short) include an absolute grant value of 5 bits and an absolute grant scope of 1 bit.

When a 2 ms enhanced dedicated channel (E-DCH for short) TTI is adopted, a timing setting for an absolute grant (AG for short) from being received till becoming effective is as follow: E-DCH control information (namely, AG) firstly received by a user equipment (UE for short) on the $j^{th}$ subframe of an E-AGCH frame in the $i^{th}$ system frame number (SFN for short), is corresponding to the $t^{th}$ subframe of an E-DCH dedicated physical data channel (E-DPDCH for short) in the $(i+s)^{th}$ SFN.

Configuring two E-DCH radio network temporary identifiers (E-RNTI for short) for each UE is supported in the present protocol, where a primary E-RNTI (P-E-RNTI) is an exclusive identification for each UE, theoretically, one-to-many control can be realized by configuring the same secondary E-RNTI (S-E-RNTI for short), however, the S-E-RNTI can neither be used for a process deactivation nor be used for per HARQ activation.

In the process of realizing the present invention, the inventors find that: the operation of activating and/or deactivating a process of a group cannot be performed in the prior art, in a per HARQ scheduling system, the usage amount of AGs re too big, resulting in large consume of downlink code resources, thereby affecting the downlink throughput.

SUMMARY

The present invention provides a method for group scheduling grant, a user equipment and a radio network controller, so as to improve the utilization efficiency of downlink code resources, and prevent the downlink throughput from being limited.

The first aspect of the present invention provides a method for group scheduling grant, including:

reporting, by a user equipment, to a radio network controller a capability of the user equipment to support an uplink enhanced dedicated channel;

receiving, by the user equipment, a configuration message transmitted by the radio network controller, where the configuration message carries an enhanced-radio network temporary identity E-RNTI; the E-RNTI carried in the configuration message includes an E-RNTI allocated to a group to which the user equipment belongs;

monitoring, by the user equipment, a first channel by using the E-RNTI carried in the configuration message, and activating or deactivating a hybrid automatic repeat request HARQ process according to an absolute grant received by the user equipment in the first channel.

With reference to the first aspect, in a first possible implementation of the first aspect, where the E-RNTI carried in the configuration message includes a first E-RNTI and a primary E-RNTI;

the E-RNTI allocated to the group to which the user equipment belongs is the first E-RNTI.

With reference to the first possible implementation of the first aspect, in a second optional implementation of the first aspect, where before the activating or deactivating the hybrid automatic repeat request HARQ process according to the absolute grant received by the user equipment in the first channel, further including:

when an absolute grant which is identified as the first E-RNTI or the primary E-RNTI is received by the user equipment in the first channel, determining, by the user equipment, a type of the absolute grant which is identified as the first E-RNTI or the primary E-RNTI to be a primary grant.

With reference to the first possible implementation of the first aspect or the second possible implementation of the first aspect, in a third optional implementation of the first aspect, where the activating or deactivating the hybrid automatic repeat request HARQ process according to the absolute grant received by the user equipment in the first channel includes:

if an identification of the absolute grant received by the user equipment in the first channel is the first E-RNTI, and an absolute grant value of the absolute grant is a deactivation command, then deactivating, by the user equipment, a HARQ process corresponding to a HARQ process number which is corresponding to a current TTI when an absolute grant scope of the absolute grant is per HARQ process and a 2 milliseconds transmission time interval TTI is configured; or, deactivating, by the user equipment, all HARQ processes when an absolute grant scope of the absolute grant is all HARQ processes and a 2 milliseconds TTI is configured but a secondary E-RNTI is not configured; or, activating, by the user equipment, all HARQ processes when an absolute grant scope of the absolute grant is all HARQ processes and a secondary E-RNTI is configured, setting a service grant as storing a second grant value, and setting a validity of a primary grant to be false.

With reference to the first possible implementation of the first aspect or the second possible implementation of the first aspect, in a fourth possible implementation of the first aspect, where the activating or deactivating the hybrid automatic repeat request HARQ process according to the absolute grant received by the user equipment in the first channel includes:

if an identification of the absolute grant received by the user equipment in the first channel is the first E-RNTI, and an absolute grant value of the absolute grant is not a deactivation command, then activating, by the user equipment, a HARQ process corresponding to a HARQ process number which is corresponding to a current TTI when an absolute grant scope of the absolute grant is per HARQ process; or, activating, by the user equipment, all HARQ processes when an absolute grant scope of the absolute grant is all HARQ processes.

With reference to the first possible implementation of the first aspect or the second possible implementation of the first aspect, in a fifth possible implementation of the first aspect, where the activating or deactivating the hybrid automatic repeat request HARQ process according to the absolute grant received by the user equipment in the first channel includes:

if an identification of the absolute grant received by the user equipment in the first channel is the first E-RNTI, and an absolute grant value of the absolute grant is not a deactivation command, then activating, by the user equipment, a HARQ process corresponding to a HARQ process number which is corresponding to a current TTI, and deactivating all HARQ processes except the HARQ process corresponding to the HARQ process number which is corresponding to the current TTI.

With reference to the first possible implementation of the first aspect or the second possible implementation of the first aspect, in a sixth possible implementation of the first aspect, the method further including:

if an identification of the absolute grant received by the user equipment in the first channel is the first E-RNTI, and an absolute grant value of the absolute grant is not a deactivation command, setting, by the user equipment, a validity of a primary grant to be true; or, if an identification of the absolute grant received by the user equipment in the first channel is the first E-RNTI, and an absolute grant value of the absolute grant is not a deactivation command, then starting, by the user equipment, a timer when the timer of the absolute grant is in an untriggered state; or, resetting, by the user equipment, a timer when the timer of the absolute grant is in a triggered state.

With reference to the first possible implementation of the first aspect or the second possible implementation of the first aspect, in a seventh possible implementation of the first aspect, the method further includes:

if an identification of the absolute grant received by the user equipment in the first channel is the first E-RNTI, the primary E-RNTI or a validity of a primary grant is set to be false, and an absolute grant value of the absolute grant is not a deactivation command, then setting, by the user equipment, a service grant to be a maximum value of the absolute grant value and a minimum configuration service grant value when the absolute grant value of the absolute grant is not a zero grant command; or, setting, by the user equipment, a service grant to be a zero grant when the absolute grant value of the absolute grant is a zero grant command.

With reference to any one of the first to the seventh possible implementations of the first aspect, in an eighth possible implementation of the first aspect, where the reporting, by the user equipment, to the radio network controller the capability of the user equipment to support the uplink enhanced dedicated channel includes:

reporting, by the user equipment, to the radio network controller a capability of the user equipment to support receiving an absolute grant which is identified as the first E-RNTI during an uplink enhanced dedicated channel operation.

With reference to the first aspect, in a ninth possible implementation of the first aspect, where the E-RNTI carried in the configuration message includes a primary E-RNTI and a secondary E-RNTI;

the E-RNTI allocated to the group to which the user equipment belongs is the secondary E-RNTI.

With reference to the ninth possible implementation of the first aspect, in a tenth possible implementation of the first aspect, where the activating or deactivating the hybrid automatic repeat request HARQ process according to the absolute grant received by the user equipment in the first channel includes:

if an identification of the absolute grant received by the user equipment in the first channel is the secondary E-RNTI, and an absolute grant value of the absolute grant is a deactivation command, then deactivating, by the user equipment, a HARQ process corresponding to a HARQ process number which is corresponding to a current TTI when an absolute grant scope of the absolute grant is per HARQ process and a 2 milliseconds TTI is configured; or, deactivating, by the user equipment, all HARQ processes when an absolute grant scope of the absolute grant is all HARQ processes and a 2 milliseconds TTI is configured.

With reference to the ninth possible implementation of the first aspect, in an eleventh possible implementation of the first aspect, where the activating or deactivating the hybrid automatic repeat request HARQ process according to the absolute grant received by the user equipment in the first channel includes:

if an identification of the absolute grant received by the user equipment in the first channel is the secondary E-RNTI, and an absolute grant value of the absolute grant is not a deactivation command, then activating, by the user equipment, a HARQ process corresponding to a HARQ process number which is corresponding to a current TTI when an absolute grant scope of the absolute grant is per HARQ process; or, activating, by the user equipment, all HARQ processes when an absolute grant scope of the absolute grant is all HARQ processes.

With reference to the ninth possible implementation of the first aspect, in a twelfth possible implementation of the first aspect, where the activating or deactivating the hybrid automatic repeat request HARQ process according to the absolute grant received by the user equipment in the first channel includes:

if an identification of the absolute grant received by the user equipment in the first channel is the secondary E-RNTI, and an absolute grant value of the absolute grant is not a deactivation command, then activating, by the user equipment, a HARQ process corresponding to a HARQ process number which is corresponding to a current TTI, and deactivating all HARQ processes except the HARQ process corresponding to the HARQ process number which is corresponding to the current TTI.

With reference to the ninth possible implementation of the first aspect, in a thirteenth possible implementation of the first aspect, the method further including:

if an identification of the absolute grant received by the user equipment in the first channel is the secondary E-RNTI, and an absolute grant value of the absolute grant is not a deactivation command, then setting, by the user equipment, a service grant to be a maximum value of the absolute grant value and a minimum configuration service grant value when the absolute grant value of the absolute grant is not a zero grant command; or, setting, by the user equipment, a service grant to be a zero grant when the absolute grant value of the absolute grant is a zero grant command.

With reference to the ninth possible implementation of the first aspect, in a fourteenth possible implementation of the first aspect, the method further including:

if an identification of the absolute grant received by the user equipment in the first channel is the secondary E-RNTI, and an absolute grant value of the absolute grant is not a deactivation command, then starting, by the user equipment, a timer when the timer of the absolute grant is in an untriggered state; or, resetting, by the user equipment, a timer when the timer of the absolute grant is in a triggered state.

With reference to the first aspect, in a fifteenth possible implementation of the first aspect, where the E-RNTI carried in the configuration message includes a primary E-RNTI; or, the E-RNTI carried in the configuration message includes a primary E-RNTI and a secondary E-RNTI.

With reference to the fifteenth possible implementation of the first aspect, in a sixteenth possible implementation of the first aspect, where before the activating or deactivating the hybrid automatic repeat request HARQ process according to the absolute grant received by the user equipment in the first channel, further including:

when an absolute grant which is identified as the primary E-RNTI is received by the user equipment in the first channel, determining, by the user equipment, a type of the absolute grant which is identified as the primary E-RNTI to be a primary grant.

With reference to the fifteenth possible implementation of the first aspect or the sixteenth possible implementation of the first aspect, in a seventeenth possible implementation of the first aspect, where the activating or deactivating the hybrid automatic repeat request HARQ process according to the absolute grant received by the user equipment in the first channel includes:

if an identification of the absolute grant received by the user equipment in the first channel is the primary E-RNTI, and an absolute grant value of the absolute grant is a deactivation command, then deactivating, by the user equipment, a HARQ process corresponding to a HARQ process number which is corresponding to a current TTI when an absolute grant scope of the absolute grant is per HARQ process and a 2 milliseconds transmission time interval TTI is configured; or, deactivating, by the user equipment, all HARQ processes when an absolute grant scope of the absolute grant is all HARQ processes and a 2 milliseconds TTI is configured but a secondary E-RNTI is not configured; or, activating, by the user equipment, all HARQ processes when an absolute grant scope of the absolute grant is all HARQ processes and a secondary E-RNTI is configured, setting a service grant as storing a second grant value, and setting a validity of a primary grant to be false.

With reference to the fifteenth possible implementation of the first aspect or the sixteenth possible implementation of the first aspect, in an eighteenth possible implementation of the first aspect, where the activating or deactivating the hybrid automatic repeat request HARQ process according to the absolute grant received by the user equipment in the first channel includes:

if an identification of the absolute grant received by the user equipment in the first channel is the primary E-RNTI, and an absolute grant value of the absolute grant is not a deactivation command, then activating, by the user equipment, a HARQ process corresponding to a HARQ process number which is corresponding to a current TTI when an absolute grant scope of the absolute grant is per HARQ process; or, activating, by the user equipment, all HARQ processes when an absolute grant scope of the absolute grant is all HARQ processes.

With reference to the fifteenth possible implementation of the first aspect or the sixteenth possible implementation of the first aspect, in a nineteenth possible implementation of the first aspect, the method further includes:

if an identification of the absolute grant received by the user equipment in the first channel is the primary E-RNTI, and an absolute grant value of the absolute grant is not a deactivation command, setting, by the user equipment, a validity of a primary grant to be true.

With reference to the fifteenth possible implementation of the first aspect or the sixteenth possible implementation of the first aspect, in a twentieth possible implementation of the first aspect, the method further includes:

if an identification of the absolute grant received by the user equipment in the first channel is the primary E-RNTI, and an absolute grant value of the absolute grant is not a deactivation command, then starting, by the user equipment, a timer when the timer of the absolute grant is in an untriggered state; or, resetting, by the user equipment, a timer when the timer of the absolute grant is in a triggered state.

With reference to the fifteenth possible implementation of the first aspect or the sixteenth possible implementation of the first aspect, in a twenty-first possible implementation of the first aspect, the method further includes:

if an identification of the absolute grant received by the user equipment in the first channel is the primary E-RNTI or a validity of a primary grant is set to be false, and an absolute grant value of the absolute grant is not a deactivation command, then setting, by the user equipment, a service grant to be a maximum value of the absolute grant value and a minimum configuration service grant value when the absolute grant value of the absolute grant is not a zero grant command; or, setting, by the user equipment, a service grant to be a zero grant when the absolute grant value of the absolute grant is a zero grant command.

With reference to any one of the first to the twenty-first possible implementations of the first aspect, where the first channel includes an enhanced dedicated channel absolute grant channel E-AGCH, a common E-AGCH or a non-serving E-AGCH.

The second aspect of the present invention provides a method for group scheduling grant, including:

receiving, by a base station, uplink enhanced dedicated channel configuration information of a user equipment transmitted by a radio network controller, and then configuring an enhanced-radio network temporary identity E-RNTI for the user equipment;

transmitting, by the base station, the E-RNTI configured for the user equipment to the radio network controller, so as to enable the radio network controller to transmit the E-RNTI configured by the base station for the user equipment to the user equipment; wherein the E-RNTI configured by the base station for the user equipment comprises an E-RNTI allocated by the base station to a group to which the user equipment belongs;

transmitting, by the base station, an absolute grant which is identified as the configured E-RNTI to the user equipment through a first channel.

With reference to the second aspect, in a first possible implementation of the second aspect, where the configuring the enhanced-radio network temporary identity E-RNTI for the user equipment includes:

configuring, by the base station, a first E-RNTI and a primary E-RNTI for the user equipment;

the E-RNTI allocated by the base station to the group to which the user equipment belongs is the first E-RNTI.

With reference to the first possible implementation of the second aspect, in a second possible implementation of the second aspect, where the transmitting, by the base station, the absolute grant which is identified as the configured E-RNTI to the user equipment through the first channel includes:

if current control demand is single control, then transmitting, by the base station, an absolute grant which is identified as the primary E-RNTI to the user equipment through the first channel; or, if current control demand is group control, then transmitting, by the base station, an absolute grant which is identified as the first E-RNTI to the user equipment through the first channel.

With reference to the first possible implementation of the second aspect, in a third possible implementation of the second aspect, where after the transmitting, by the base station, the absolute grant which is identified as the configured E-RNTI to the user equipment through the first channel, further including:

if the base station needs to change the first E-RNTI of the user equipment, then transmitting, by the base station, an updated first E-RNTI to the radio network controller, and notifying the radio network controller to perform an alternation of the first E-RNTI, so as to enable the radio network controller to transmit the updated first E-RNTI to the user equipment.

With reference to the second aspect, in a fourth possible implementation of the second aspect, where the configuring the enhanced-radio network temporary identity E-RNTI for the user equipment includes:

configuring, by the base station, a primary E-RNTI and a secondary. E-RNTI for the user equipment;

the E-RNTI allocated by the base station to the group to which the user equipment belongs is the secondary E-RNTI.

With reference to the fourth possible implementation of the second aspect, in a fifth possible implementation of the second aspect, where the transmitting, by the base station, the absolute grant which is identified as the configured E-RNTI to the user equipment through the first channel includes:

if current control demand is single control, then transmitting, by the base station, an absolute grant which is identified as the primary E-RNTI to the user equipment through the first channel; or, if current control demand is group control, then transmitting, by the base station, an absolute grant which is identified as the secondary E-RNTI to the user equipment through the first channel.

With reference to the fourth possible implementation of the second aspect or the fifth possible implementation of the second aspect, in a sixth possible implementation of the second aspect, where after the transmitting, by the base station, the absolute grant which is identified as the configured E-RNTI to the user equipment through the first channel, further including:

if the base station needs to change the secondary E-RNTI of the user equipment, then transmitting, by the base station, an updated secondary E-RNTI to the radio network controller, and notifying the radio network controller to perform an alternation of the secondary E-RNTI, so as to enable the radio network controller to transmit the updated secondary E-RNTI to the user equipment.

With reference to the second aspect, in a seventh possible implementation of the second aspect, where the configuring the enhanced-radio network temporary identity E-RNTI for the user equipment includes:

configuring, by the base station, a primary E-RNTI for the user equipment; or, configuring, by the base station, a primary E-RNTI and a secondary E-RNTI for the user equipment.

With reference to the seventh possible implementation of the second aspect, in an eighth possible implementation of the second aspect, where after the configuring the enhanced-radio network temporary identity E-RNTI for the user equipment, further including:

transmitting, by the base station, HARQ process information allocated by the base station for the user equipment to the radio network controller.

With reference to the eighth possible implementation of the second aspect, in a ninth possible implementation of the second aspect, where after the transmitting, by the base station, the HARQ process information allocated for the user equipment to the radio network controller, further including:

transmitting, by the base station, process state information of the user equipment to the radio network controller, so as to enable the radio network controller to initially configure or reconfigure process state of the user equipment according to the process state information.

With reference to any one of the seventh to the ninth possible implementations of the second aspect, in a tenth possible implementation of the second aspect, where after the transmitting, by the base station, the absolute grant which is identified as the configured E-RNTI to the user equipment through the first channel, further including:

transmitting, by the base station, process state information of the user equipment to the radio network controller.

With reference to the ninth possible implementation of the second aspect or the tenth possible implementation of the second aspect, in an eleventh possible implementation of the second aspect, where the process state information includes any one or a combination of hybrid automatic repeat request HARQ, activation or deactivation state information of the user equipment, load information of an HARQ process, high low rate indication information and indicating grant information.

With reference to the second aspect, or with reference to any one of the first to the tenth possible implementation of the second aspect, in a twelfth possible implementation of the second aspect, where after the receiving, by the base station, the uplink enhanced dedicated channel configuration information of the user equipment transmitted by the radio network controller, and before the configuring the enhanced-radio network temporary identity E-RNTI for the user equipment, further including:

receiving, by the base station, an indication message transmitted by the radio network controller, wherein the indication message is used for indicating the base station to perform a message configuration for radio link establishment.

With reference to the second aspect, or with reference to any one of the first to the tenth possible implementations of the second aspect, in a thirteenth possible implementation of the second aspect, where the configuring the enhanced-radio network temporary identity E-RNTI for the user equipment includes:

configuring, by the base station, the E-RNTI for the user equipment according to current control reference information; wherein the current control reference information comprises any one or a combination of: a rate of the user equipment, a data block of the user equipment, a process number allocated to the user equipment, group information corresponding to the user equipment and current process usage situation of a cell.

With reference to the second aspect, or with reference to any one of the first to the tenth possible implementation of the second aspect, in a fourteenth possible implementation of the second aspect, where the absolute grant comprises an activation indication or a deactivation indication of a HARQ process of the user equipment, and the activation indication of the HARQ process of the user equipment is a specific grant value.

The third aspect of the present invention provides a method for group scheduling grant, including:

receiving, by a radio network controller, a capability of a user equipment to support an uplink enhanced dedicated channel reported by the user equipment;

transmitting, by the radio network controller, uplink enhanced dedicated channel configuration information of the user equipment to a base station;

receiving, by the radio network controller, an E-RNTI which is configured by the base station for the user equipment and is transmitted by the base station; wherein the E-RNTI configured by the base station for the user equipment comprises an E-RNTI allocated by the base station to a group to which the user equipment belongs;

transmitting, by the radio network controller, the E-RNTI configured by the base station for the user equipment to the user equipment, so as to enable the user equipment to monitor a first channel by using the configured E-RNTI, and activate or deactivate a hybrid automatic repeat request HARQ process according to an absolute grant received in the first channel.

With reference to the third aspect, in a first possible implementation of the third aspect, where the E-RNTI configured by the base station for the user equipment comprises a first E-RNTI and a primary E-RNTI; the E-RNTI allocated by the base station to the group to which the user equipment belongs is the first E-RNTI.

With reference to the first possible implementation of the third aspect, in a second possible implementation of the third aspect, where after the transmitting, by the radio network controller, the E-RNTI configured by the base station for the user equipment to the user equipment, further including:

receiving, by the radio network controller, an updated first E-RNTI transmitted by the base station, and receiving a notification for performing an alternation of the first E-RNTI transmitted by the base station;

transmitting, by the radio network controller, the updated first E-RNTI to the user equipment.

With reference to the third aspect, in the third possible implementation of the third aspect, where the E-RNTI configured by the base station for the user equipment includes a primary E-RNTI and a secondary E-RNTI;

the E-RNTI allocated by the base station to the group to which the user equipment belongs is the secondary E-RNTI.

With reference to the third possible implementation of the third aspect, in a fourth possible implementation of the third aspect, where after the transmitting, by the radio network controller, the E-RNTI configured by the base station for the user equipment to the user equipment, further including:

receiving, by the radio network controller, an updated secondary E-RNTI transmitted by the base station, and receiving a notification for performing an alternation of the secondary E-RNTI transmitted by the base station;

transmitting, by the radio network controller, the updated secondary E-RNTI to the user equipment.

With reference to the third aspect, in a fifth possible implementation of the fifth aspect, where the E-RNTI carried in the configuration message includes a primary E-RNTI; or, the E-RNTI carried in the configuration message includes a primary E-RNTI and a secondary E-RNTI.

With reference to the fifth possible implementation of the third aspect, in a sixth possible implementation of the third aspect, where after the transmitting, by the radio network controller, the uplink enhanced dedicated channel configuration information of the user equipment to the base station, further including:

receiving, by the radio network controller, HARQ process information allocated by the base station to the user equipment.

With reference to the sixth possible implementation of the third aspect, in a seventh possible implementation of the third aspect, where after the receiving, by the radio network controller, the HARQ process information allocated by the base station to the user equipment, further including:

receiving, by the radio network controller, process state information allocated by the base station to the user equipment;

initially configuring or reconfiguring, by the radio network controller, process state information of the user equipment according to the process state information.

With reference to any one of the fifth to the seventh possible implementations of the third aspect, in an eighth possible implementation of the third aspect, where after the transmitting, by the radio network controller, the E-RNTI configured by the base station for the user equipment to the user equipment, further including:

receiving, by the radio network controller, process state information of the user equipment transmitted by the base station.

With reference to any one of the first to the eighth possible implementations of the third aspect, in a ninth possible implementation of the second aspect, where after the transmitting, by the radio network controller, the uplink enhanced dedicated channel configuration information of the user equipment to the base station, and before the receiving, by the radio network controller, the E-RNTI which is configured by the base station for the user equipment and is transmitted by the base station, further including:

transmitting, by the radio network controller, an indication message to the base station, wherein the indication message is used for indicating the base station to perform a message configuration for radio link establishment.

The fourth aspect of the present invention provides a user equipment, including:

a reporting module, configured to report to a radio network controller a capability of the user equipment to support an uplink enhanced dedicated channel;

a receiving module, configured to receive a configuration message transmitted by the radio network controller, wherein the configuration message carries an enhanced-radio network temporary identity E-RNTI; the E-RNTI carried in the configuration message comprises an E-RNTI allocated to a group to which the user equipment belongs;

a monitoring module, configured to monitor a first channel by using the E-RNTI carried in the configuration message which is received by the receiving module;

an activating/deactivating module, configured to activate or deactivate a hybrid automatic repeat request HARQ process according to an absolute grant received by the monitoring module in the first channel.

With reference to the fourth aspect, in a first possible implementation of the fourth aspect, where the E-RNTI carried in the configuration message which is received by the receiving module comprises a first E-RNTI and a primary E-RNTI;

the E-RNTI allocated to the group to which the user equipment belongs is the first E-RNTI.

With reference to the first possible implementation of the fourth aspect, in a second possible implementation of the fourth aspect, where the user equipment further includes:

a first determining module, configured to, before the activating/deactivating module activates or deactivates the HARQ process, and when an absolute grant which is identified as the first E-RNTI or the primary E-RNTI is received in the first channel by the monitoring module, determine a type of the absolute grant which is identified as the first E-RNTI or the primary E-RNTI to be a primary grant.

With reference to the first possible implementation of the fourth aspect or the second possible implementation of the fourth aspect, in a third possible implementation of the fourth aspect, where the activating/deactivating module is specifically configured to, when an identification of the absolute grant received by the monitoring module in the first channel is the first E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds transmission time interval TTI is configured; or, deactivate all HARQ processes if an absolute grant scope of the absolute grant is all HARQ processes and a 2 milliseconds TTI is configured but a secondary E-RNTI is not configured; or, activate all HARQ processes if an absolute grant scope of the absolute grant is all HARQ processes and a secondary E-RNTI is configured, set a service grant as storing a second grant value, and set a validity of a primary grant to be false.

With reference to the first possible implementation of the fourth aspect or the second possible implementation of the fourth aspect, in a fourth possible implementation of the fourth aspect, where the activating/deactivating module is specifically configured to, when an identification of the absolute grant received by the monitoring module in the first channel is the first E-RNTI, and an absolute grant value of the absolute grant is not a deactivation command, activate an HARQ process corresponding to an HARQ process number which is corresponding to a current TTI if an absolute grant scope of the absolute grant is per HARQ process; or, activate all HARQ processes if an absolute grant scope of the absolute grant is all HARQ processes.

With reference to the first possible implementation of the fourth aspect or the second possible implementation of the fourth aspect, in a fifth possible implementation of the fourth aspect, where the activating/deactivating module is specifically configured to, when an identification of the absolute grant received by the monitoring module in the first channel is the first E-RNTI, and an absolute grant value of the absolute grant is not a deactivation command, activate an HARQ process corresponding to an HARQ process number which is corresponding to a current TTI, and deactivate all HARQ processes except the HARQ process corresponding to the HARQ process number which is corresponding to the current TTI.

With reference to the first possible implementation of the fourth aspect or the second possible implementation of the fourth aspect, in a sixth possible implementation of the fourth aspect, the user equipment further includes a first setting module; where:

the first setting module is configured to, when an identification of the absolute grant received by the monitoring module in the first channel is the first E-RNTI, and an absolute grant value of the absolute grant is not a deactivation command, set a validity of the primary grant to be true; or, the first setting module is configured to, when an identification of the absolute grant received by the monitoring module in the first channel is the first E-RNTI, and an absolute grant value of the absolute grant is not a deactivation command, start a timer if the timer of the absolute grant is in an untriggered state, or, reset a timer if the timer of the absolute grant is in a triggered state; or, the first setting module is configured to, when an identification of the absolute grant received by the monitoring module in the first channel is the first E-RNTI, the primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

With reference to any one of the first to the sixth possible implementations of the fourth aspect, in a seventh possible implementation of the fourth aspect, where the reporting module is specifically configured to report to the radio network controller a capability of the user equipment to support receiving an absolute grant which is identified as the first E-RNTI during an uplink enhanced dedicated channel operation.

With reference to the fourth aspect, in an eighth possible implementation of the fourth aspect, where the E-RNTI carried in the configuration message which is received by the receiving module comprises a primary E-RNTI and a secondary E-RNTI;

the E-RNTI allocated to the group to which the user equipment belongs is the secondary E-RNTI.

With reference to the eighth possible implementation of the fourth aspect, in a ninth possible implementation of the fourth aspect, where the activating/deactivating module is specifically configured to, when an identification of the absolute grant received by the monitoring module in the first channel is the secondary E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds TTI is configured; or, deactivate all HARQ processes if an absolute grant scope of the absolute grant is all HARQ processes and a 2 milliseconds TTI is configured.

With reference to the eighth possible implementation of the fourth aspect, in a tenth possible implementation of the fourth aspect, where the activating/deactivating module is specifically configured to, when an identification of the absolute grant received by the monitoring module in the first channel is the secondary E-RNTI, and an absolute grant value of the absolute grant is not a deactivation command, activate an HARQ process corresponding to an HARQ process number which is corresponding to a current TTI if the absolute grant scope of the absolute grant is per HARQ process; or, activate all the HARQ processes if the absolute grant scope of the absolute grant is all HARQ processes.

With reference to the eighth possible implementation of the fourth aspect, in an eleventh possible implementation of the fourth aspect, where the activating/deactivating module is specifically configured to, when an identification of the absolute grant received by the monitoring module in the first channel is the secondary E-RNTI, and an absolute grant value of the absolute grant is not a deactivation command, activate an HARQ process corresponding to an HARQ process number which is corresponding to a current TTI, and deactivate all HARQ processes except the HARQ process corresponding to the HARQ process number which is corresponding to the current TTI.

With reference to the eighth possible implementation of the fourth aspect, in a twelfth possible implementation of the fourth aspect, the user equipment further includes a second setting module; where, the second setting module is configured to, when an identification of the absolute grant received by the monitoring module in the first channel is the secondary E-RNTI, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command; or, the second setting module is configured to, when an identification of the absolute grant received by the monitoring module in the first channel is the secondary E-RNTI, and an absolute grant value of the absolute grant is not a deactivation command, start a timer if the timer of the absolute grant is in an untriggered state; or, reset a timer if the timer of the absolute grant is in a triggered state.

With reference to the fourth aspect, in a thirteenth possible implementation of the fourth aspect, where the E-RNTI carried in the configuration message which is received by the receiving module includes a primary E-RNTI; or, the E-RNTI carried in the configuration message which is received by the receiving module includes a primary E-RNTI and a secondary E-RNTI.

With reference to the thirteenth possible implementation of the fourth aspect, in a fourteenth possible implementation of the fourth aspect, where the user equipment further includes a second determining module, where the second determining module is configured to, before the activating/deactivating module activates or deactivates the HARQ process, and when an absolute grant which is identified as the primary E-RNTI is received in the first channel by the monitoring module, determine a type of the absolute grant which is identified as the primary E-RNTI to be a primary grant.

With reference to the thirteenth possible implementation of the fourth aspect or the fourteenth possible implementation of the fourth aspect, in a fifteenth possible implementation of the fourth aspect, where the activating/deactivating module is specifically configured to, when an identification of the absolute grant received by the monitoring module in the first channel is the primary E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds transmission time interval TTI is configured; or, deactivate all HARQ processes if an absolute grant scope of the absolute grant is all HARQ processes and a 2 milliseconds TTI is configured but a secondary E-RNTI is not configured; or, activate all HARQ processes if an absolute grant scope of the absolute grant is all HARQ processes and a secondary E-RNTI is configured, set a service grant as storing a second grant value, and set a validity of a primary grant to be false.

With reference to the thirteenth possible implementation of the fourth aspect or the fourteenth possible implementation of the fourth aspect, in a sixteenth possible implementation of the fourth aspect, where the activating/deactivating module is specifically configured to, when an identification of the absolute grant received by the monitoring module in the first channel is the primary E-RNTI, and an absolute grant value of the absolute grant is not a deactivation command, activate an HARQ process corresponding to an HARQ process number which is corresponding to a current TTI if an absolute grant scope of the absolute grant is per HARQ process; or, activate all HARQ processes if an absolute grant scope of the absolute grant is all HARQ processes.

With reference to the thirteenth possible implementation of the fourth aspect or the fourteenth possible implementation of the fourth aspect, in a seventeenth possible implementation of the fourth aspect, the user equipment further includes a third setting module, where, the third setting module is configured to, when an identification of the absolute grant received by the monitoring module in the first channel is the primary E-RNTI, and an absolute grant value of the absolute grant is not a deactivation command, set a validity of the primary grant to be true; or, the third setting module is configured to, when an identification of the absolute grant received by the monitoring module in the first channel is the primary E-RNTI, and an absolute grant value of the absolute grant is not a deactivation command, start a timer if the timer of the absolute grant is in an untriggered state, or, reset a timer if the timer of the absolute grant is in a triggered state; or, the third setting module is configured to, when an identification of the absolute grant received by the monitoring module in the first channel is the primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

The fifth aspect of the present invention provides a base station, including:

a receiving module, configured to receive uplink enhanced dedicated channel configuration information of a user equipment transmitted by a radio network controller;

a configuring module, configured to configure an enhanced-radio network temporary identity E-RNTI for a user equipment after the uplink enhanced dedicated channel configuration information of the user equipment transmitted by the radio network controller is received by the receiving module; wherein the E-RNTI configured by the configuring module for the user equipment comprises an E-RNTI allocated by the configuring module to a group to which the user equipment belongs;

a transmitting module, configured to transmit the E-RNTI configured by the configuring module for the user equipment to the radio network controller, and transmit an absolute grant which is identified as the configured E-RNTI to the user equipment through a first channel.

With reference to the fifth aspect, in a first possible implementation of the fifth aspect, where the configuring module is specifically configured to configure a first E-RNTI and a primary E-RNTI for the user equipment;

the E-RNTI allocated by the configuring module to the group to which the user equipment belongs is the first E-RNTI.

With reference to the first possible implementation of the fifth aspect, in a second possible implementation of the fifth aspect, where the transmitting module configured to transmit the absolute grant which is identified as the configured E-RNTI to the user equipment through the first channel includes:

the transmitting module, specifically configured to transmit an absolute grant which is identified as the primary E-RNTI to the user equipment through the first channel when current control demand is single control; or, transmit an absolute grant which is identified as the first E-RNTI to the user equipment through the first channel when current control demand is group control.

With reference to the first possible implementation of the fifth aspect or the second possible implementation of the fifth aspect, in a third possible implementation of the fifth aspect, where the transmitting module is further configured to, after the absolute grant which is identified as the configured E-RNTI is transmitted to the user equipment through the first channel, and when the base station needs to change the first E-RNTI of the user equipment, transmit an updated first E-RNTI to the radio network controller, and notify the radio network controller to perform an alternation of the first E-RNTI, so as to enable the radio network controller to transmit the updated first E-RNTI to the user equipment.

With reference to the fifth aspect, in a fourth possible implementation of the fifth aspect, where the configuring module is specifically configured to configure a primary E-RNTI and a secondary E-RNTI for the user equipment;

the E-RNTI allocated by the configuring module to the group to which the user equipment belongs is the secondary E-RNTI.

With reference to the fourth possible implementation of the fifth aspect, in a fifth possible implementation of the fifth aspect, where the transmitting module configured to transmit the absolute grant which is identified as the configured E-RNTI to the user equipment through the first channel includes:

the transmitting module, specifically configured to transmit an absolute grant which is identified as the primary E-RNTI to the user equipment through the first channel when current control demand is single control; or, transmit an absolute grant which is identified as the secondary E-RNTI to the user equipment through the first channel when current control demand is group control.

With reference to the fourth possible implementation of the fifth aspect or the fifth possible implementation of the fifth aspect, in a sixth possible implementation of the fifth aspect, where the transmitting module is further configured to, after the absolute grant which is identified as the configured E-RNTI is transmitted to the user equipment through the first channel, and when the base station needs to change the secondary E-RNTI of the user equipment, transmit an updated secondary E-RNTI to the radio network controller, and notify the radio network controller to perform an alternation of the secondary E-RNTI, so as to enable the radio network controller to transmit the updated secondary E-RNTI to the user equipment.

With reference to the fifth aspect, in a seventh possible implementation of the fifth aspect, where the configuring module is specifically configured to configure a primary E-RNTI for the user equipment; or, configuring, by the base station, a primary E-RNTI and a secondary E-RNTI for the user equipment.

With reference to the seventh possible implementation of the fifth aspect, in an eighth possible implementation of the fifth aspect, where the transmitting module is further configured to transmit HARQ process information allocated by the configuring module for the user equipment to the radio network controller after an E-RNTI is configured for the user equipment by the configuring module.

With reference to the eighth possible implementation of the fifth aspect, in a ninth possible implementation of the fifth aspect, where the transmitting module is further configured to transmit process state information of the user equipment to the radio network controller after transmitting the HARQ process information allocated by the configuring module for the user equipment to the radio network controller, so as to enable the radio network controller to initially configure or reconfigure process state of the user equipment according to the process state information.

With reference to any one of the seventh to the ninth possible implementations of the fifth aspect, in a tenth possible implementation of the fifth aspect, where the transmitting module is further configured to transmit process state information of the user equipment to the radio network controller after transmitting an absolute grant which is identified as the configured E-RNTI to the user equipment through the first channel.

With reference to any one of the first to the tenth possible implementations of the fifth aspect, in an eleventh possible implementation of the fifth aspect, where the receiving module is further configured to, after the uplink enhanced dedicated channel configuration information of the user equipment transmitted by the radio network controller is received, and before the enhanced-radio network temporary identity E-RNTI is configured for the user equipment by the configuring module, receive an indication message transmitted by the radio network controller, wherein the indication message is used for indicating the base station to perform a message configuration for radio link establishment.

With reference to any one of the first to the tenth possible implementations of the fifth aspect, in a twelfth possible implementation of the fifth aspect, where the configuring module is specifically configured to configure the E-RNTI for the user equipment according to current control reference information; wherein the current control reference information comprises any one or a combination of: a rate of the user equipment, a data block of the user equipment, a process number allocated for the user equipment, group information corresponding to the user equipment and current process usage situation of a cell.

The sixth aspect of the present invention provides a radio network controller, including:

a receiving module, configured to receive a capability of a user equipment to support an uplink enhanced dedicated channel reported by the user equipment; and receive an E-RNTI which is configured by a base station for the user equipment transmitted by the base station, after a base station uplink enhanced dedicated channel configuration information of the user equipment is transmitted to the base station by a transmitting module; wherein the E-RNTI configured by the base station for the user equipment comprises an E-RNTI allocated by the base station to a group to which the user equipment belongs;

the transmitting module, configured to transmit the uplink enhanced dedicated channel configuration information of the user equipment to the base station; and transmit the E-RNTI configured by the base station for the user equipment to the user equipment after the E-RNTI which is configured by the base station for the user equipment and transmitted by the base station is received by the receiving module, so as to enable the user equipment to monitor a first channel by using the configured E-RNTI, and activate or deactivate a hybrid automatic repeat request HARQ process according to an absolute grant received in the first channel.

With reference to the sixth aspect, in a first possible implementation of the sixth aspect, where the E-RNTI which is configured by the base station for the user equipment and received by the receiving module comprises a first E-RNTI and a primary E-RNTI;

where, the E-RNTI allocated by the base station to the group to which the user equipment belongs is the first E-RNTI.

With reference to the first possible implementation of the sixth aspect, in a second possible implementation of the sixth aspect, where the receiving module is further configured to receive an updated first E-RNTI transmitted by the base station after the E-RNTI configured by the base station for the user equipment is transmitted to the user equipment by the transmitting module, and receive a notification for performing an alternation of the first E-RNTI transmitted by the base station;

the transmitting module is further configured to transmit the updated first E-RNTI received by the receiving module to the user equipment.

With reference to the sixth aspect, in a third possible implementation of the sixth aspect, where the E-RNTI which is configured by the base station for the user equipment and received by the receiving module comprises a primary E-RNTI and a secondary E-RNTI;

where, the E-RNTI allocated by the base station to the group to which the user equipment belongs is the secondary E-RNTI.

With reference to the third possible implementation of the sixth aspect, in a fourth possible implementation of the sixth aspect, where the receiving module is further configured to receive an updated secondary E-RNTI transmitted by the base station after the E-RNTI configured by the base station for the user equipment is transmitted to the user equipment by the transmitting module, and receive a notification for performing an alternation of the secondary E-RNTI transmitted by the base station;

the transmitting module is further configured to transmit the updated secondary E-RNTI received by the receiving module to the user equipment.

With reference to the sixth aspect, in a fifth possible implementation of the sixth aspect, where the E-RNTI which is configured by the base station for the user equipment and received by the receiving module includes a primary E-RNTI; or, the E-RNTI which is configured by the base station for the user equipment and received by the receiving module includes a primary E-RNTI and a secondary E-RNTI.

With reference to the fifth possible implementation of the sixth aspect, in a sixth possible implementation of the sixth aspect, where the receiving module is further configured to receive HARQ process information allocated by the base station for the user equipment after uplink enhanced dedicated channel configuration information of the user equipment is transmitted to a base station by the transmitting module.

With reference to the sixth possible implementation of the sixth aspect, in a seventh possible implementation of the sixth aspect, where the radio network controller further includes: a configuring module;

the receiving module is further configured to receive process state information allocated by the base station for the user equipment after receiving HARQ process information allocated by the base station for the user equipment;

the configuring module is further configured to initially configure or reconfigure process state information of the user equipment according to the process state information received by the receiving module.

With reference to any one of the fifth to the seventh possible implementations of the sixth aspect, in an eighth possible implementation of the sixth aspect, where the receiving module is further configured to receive process state information of the user equipment transmitted by the base station after the E-RNTI configured by the base station for the user equipment is transmitted to the user equipment by the transmitting module.

With reference to any one of the first to the eighth possible implementations of the sixth aspect, in a ninth possible implementation of the sixth aspect, where the transmitting module is further configured to, after the uplink enhanced dedicated channel configuration information of the user equipment is transmitted to the base station, and before the E-RNTI which is configured by the base station for the user equipment and transmitted by the base station is received by the receiving module, transmit an indication message to the base station, wherein the indication message is configured to indicate the base station to perform a message configuration for radio link establishment.

The seventh aspect of the present invention provides a user equipment, including:

a transmitter, configured to report to a radio network controller a capability of the user equipment to support an uplink enhanced dedicated channel;

a receiver, configured to receive a configuration message transmitted by the radio network controller, wherein the configuration message carries an enhanced-radio network temporary identity E-RNTI; the E-RNTI carried in the configuration message comprises an E-RNTI allocated to a group to which the user equipment belongs;

a processor, configured to monitor a first channel by using the E-RNTI carried in the configuration message which is received by the receiver, and activate or deactivate a hybrid automatic repeat request HARQ process according to an absolute grant received in the first channel.

With reference to the seventh aspect, in a first possible implementation of the seventh aspect, where the E-RNTI carried in the configuration message which is received by the receiver comprises a first E-RNTI and a primary E-RNTI;

the E-RNTI allocated to the group to which the user equipment belongs is the first E-RNTI.

With reference to the first possible implementation of the seventh aspect, in a second possible implementation of the seventh aspect, where the processor is further configured to, before activating or deactivating the HARQ process, and when an absolute grant which is identified as the first E-RNTI or the primary E-RNTI is received in the first channel, determine a type of the absolute grant which is identified as the first E-RNTI or the primary E-RNTI to be a primary grant.

With reference to the first possible implementation of the seventh aspect or the second possible implementation of the seventh aspect, in a third possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the first E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds transmission time interval TTI is configured; or, deactivate all HARQ processes if an absolute grant scope of the absolute grant is all HARQ processes and a 2 milliseconds TTI is configured but a secondary E-RNTI is not configured; or, activate all HARQ processes if an absolute grant scope of the absolute grant is all HARQ processes and a secondary E-RNTI is configured, set a service grant as storing a second grant value, and set a validity of a primary grant to be false.

With reference to the first possible implementation of the seventh aspect or the second possible implementation of the seventh aspect, in a fourth possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the first E-RNTI, and an absolute grant value of the absolute grant is not a deactivation command, activate an HARQ process corresponding to an HARQ process number which is corresponding to a current TTI if an absolute grant scope of the absolute grant is per HARQ process; or, activate all HARQ processes if an absolute grant scope of the absolute grant is all HARQ processes.

With reference to the first possible implementation of the seventh aspect or the second possible implementation of the seventh aspect, in a fifth possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the first E-RNTI, and an absolute grant value of the absolute grant is not a deactivation command, activate an HARQ process corresponding to an HARQ process number which is corresponding to a current TTI, and deactivate all HARQ processes except the HARQ process corresponding to the HARQ process number which is corresponding to the current TTI.

With reference to the first possible implementation of the seventh aspect or the second possible implementation of the seventh aspect, in a sixth possible implementation of the seventh aspect, where the processor is further configured to, when an identification of the absolute grant received in the first channel is the first E-RNTI, and an absolute grant value of the absolute grant is not a deactivation command, set a validity of a primary grant to be true; or, the processor is further configured to, when an identification of the absolute grant received in the first channel is the first E-RNTI, and an absolute grant value of the absolute grant is not a deactivation command, start a timer if the timer of the absolute grant is in an untriggered state, or, reset a timer if the timer of the absolute grant is in a triggered state.

With reference to the first possible implementation of the seventh aspect or the second possible implementation of the seventh aspect, in a seventh possible implementation of the seventh aspect, where the processor is further configured to, when an identification of the absolute grant received in the first channel is the first E-RNTI, the primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

With reference to any one of the first to the seventh possible implementations of the seventh aspect, in an eighth possible implementation of the seventh aspect, where the transmitter is specifically configured to report to the radio network controller a capability of the user equipment to support receiving an absolute grant which is identified as the first E-RNTI during an uplink enhanced dedicated channel operation.

With reference to the seventh aspect, in a ninth possible implementation of the seventh aspect, where the E-RNTI carried in the configuration message which is received by the receiver comprises a primary E-RNTI and a secondary E-RNTI;

the E-RNTI allocated to the group to which the user equipment belongs is the secondary E-RNTI.

With reference to the ninth possible implementation of the seventh aspect, in a tenth possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the secondary E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds TTI is configured; or, deactivate all HARQ processes if an absolute grant scope of the absolute grant is all HARQ processes and a 2 milliseconds TTI is configured.

With reference to the ninth possible implementation of the seventh aspect, in an eleventh possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the secondary E-RNTI, and an absolute grant value of the absolute grant is not a deactivation command, activate an HARQ process corresponding to an HARQ process number which is corresponding to a current TTI if an absolute grant scope of the absolute grant is per HARQ process; or, activate all HARQ processes if an absolute grant scope of the absolute grant is all HARQ processes.

With reference to the ninth possible implementation of the seventh aspect, in a twelfth possible implementation of the seventh aspect, the processor configured to activate or deactivate the hybrid automatic repeat request HARQ process according to the absolute grant received in the first channel includes:

the processor, specifically configured to, when an identification of the absolute grant received in the first channel is the secondary E-RNTI, and an absolute grant value of the absolute grant is not a deactivation command, activate an HARQ process corresponding to an HARQ process number which is corresponding to a current TTI, and deactivate all HARQ processes except the HARQ process corresponding to the HARQ process number which is corresponding to the current TTI.

With reference to the ninth possible implementation of the seventh aspect, in a thirteenth possible implementation of the seventh aspect, where the processor is further configured to, when an identification of the absolute grant received in the first channel is the secondary E-RNTI, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

With reference to the ninth possible implementation of the seventh aspect, in a fourteenth possible implementation of the seventh aspect, where the processor is further configured to, when an identification of the absolute grant received in the first channel is the secondary E-RNTI, and an absolute grant value of the absolute grant is not a deactivation command, start a timer if the timer of the absolute grant is in an untriggered state; or, reset a timer if the timer of the absolute grant is in a triggered state.

With reference to the seventh aspect, in a fifteenth possible implementation of the seventh aspect, where the E-RNTI carried in the configuration message which is received by the receiver includes a primary E-RNTI; or, the E-RNTI carried in the configuration message which is received by the receiver includes a primary E-RNTI and a secondary E-RNTI.

With reference to the fifteenth possible implementation of the seventh aspect, in the sixteenth possible implementation of the seventh aspect, where the processor is further configured to, before activating or deactivating the HARQ process, and when an absolute grant which is identified as the primary E-RNTI is received in the first channel, determine a type of the absolute grant which is identified as the first E-RNTI or the primary E-RNTI to be a primary grant.

With reference to the fifteenth possible implementation of the seventh aspect or the sixteenth possible implementation of the seventh aspect, in a seventeenth possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the primary E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds transmission time interval TTI is configured; or, deactivate all HARQ processes if an absolute grant scope of the absolute grant is all HARQ processes and a 2 milliseconds TTI is configured but a secondary E-RNTI is not configured; or, activate all HARQ processes if an absolute grant scope of the absolute grant is all HARQ processes and a secondary E-RNTI is configured, set a service grant as storing a second grant value, and set a validity of a primary grant to be false.

With reference to the fifteenth possible implementation of the seventh aspect or the sixteenth possible implementation of the seventh aspect, in an eighteenth possible implementation of the seventh aspect, where the processor configured to activate or deactivate the hybrid automatic repeat request HARQ process according to the absolute grant received in the first channel includes:

the processor, specifically configured to, when an identification of the absolute grant received in the first channel is the primary E-RNTI, and an absolute grant value of the absolute grant is not a deactivation command, activate an HARQ process corresponding to an HARQ process number which is corresponding to a current TTI if an absolute grant scope of the absolute grant is per HARQ process; or, activate all HARQ processes if an absolute grant scope of the absolute grant is all HARQ processes.

With reference to the fifteenth possible implementation of the seventh aspect or the sixteenth possible implementation of the seventh aspect, in a nineteenth possible implementation of the seventh aspect, the processor is further configured to, when an identification of the absolute grant received in the first channel is the primary E-RNTI, and an absolute grant value of the absolute grant is not a deactivation command, set a validity of a primary grant to be true; or, the processor is further configured to, when an identification of the absolute grant received in the first channel is the primary E-RNTI, and an absolute grant value of the absolute grant is not a deactivation command, start a timer if the timer of the absolute grant is in an untriggered state, or, reset a timer if the timer of the absolute grant is in a triggered state.

With reference to the fifteenth possible implementation of the seventh aspect or the sixteenth possible implementation of the seventh aspect, in a twelfth possible implementation of the seventh aspect, where the processor is further configured to, when an identification of the absolute grant received in the first channel is the primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

The eighth aspect of the present invention provides a base station, including:

a receiver, configured to receive uplink enhanced dedicated channel configuration information of a user equipment transmitted by a radio network controller;

a processor, configured to configure an enhanced-radio network temporary identity E-RNTI for the user equipment after the uplink enhanced dedicated channel configuration information of the user equipment transmitted by a radio network controller is received by the receiver; wherein the E-RNTI configured by the processor for the user equipment comprises an E-RNTI allocated by the processor to a group to which the user equipment belongs;

a transmitter, configured to transmit the E-RNTI configured by the processor for the user equipment to the radio network controller, and transmit an absolute grant which is identified as the configured E-RNTI to the user equipment through a first channel.

With reference to the eighth aspect, in a first possible implementation of the eighth aspect, where the processor is specifically configured to configure a first E-RNTI and a primary E-RNTI for the user equipment;

the E-RNTI allocated by the processor to the group to which the user equipment belongs is the first E-RNTI.

With reference to the first possible implementation of the eighth aspect, in a second possible implementation of the eighth aspect, where the transmitter configured to transmit the absolute grant which is identified as the configured E-RNTI to the user equipment through the first channel includes:

the transmitter, specifically configured to transmit an absolute grant which is identified as the Primary E-RNTI to the user equipment through the first channel when current control demand is single control; or, transmit an absolute grant which is identified as the first E-RNTI to the user equipment through the first channel when current control demand is group control.

With reference to the first possible implementation of the eighth aspect or the second possible implementation of the eighth aspect, in a third possible implementation of the eighth aspect, where the transmitter is further configured to, after the absolute grant which is identified as the configured E-RNTI is transmitted to the user equipment through the first channel, and when the base station needs to change the first E-RNTI of the user equipment, transmit an updated first E-RNTI to the radio network controller, and notify the radio network controller to perform an alternation of the first E-RNTI, so as to enable the radio network controller to transmit the updated first E-RNTI to the user equipment.

With reference to the eighth aspect, in a fourth possible implementation of the eighth aspect, where the processor is specifically configured to configure a primary E-RNTI and a secondary E-RNTI for the user equipment;

the E-RNTI allocated by the processor to the group to which the user equipment belongs is the secondary E-RNTI.

With reference to the fourth possible implementation of the eighth aspect, in a fifth possible implementation of the eighth aspect, where the transmitter configured to transmit the absolute grant which is identified as the configured E-RNTI to the user equipment through the first channel includes:

the transmitter, specifically configured to transmit an absolute grant which is identified as the primary E-RNTI to the user equipment through the first channel when current control demand is single control; or, transmit an absolute grant which is identified as the secondary E-RNTI to the user equipment through the first channel when current control demand is group control.

With reference to the fourth possible implementation of the eighth aspect or the fifth possible implementation of the eighth aspect, in a sixth possible implementation of the eighth aspect, where the transmitter is further configured to, after the absolute grant which is identified as the configured E-RNTI is transmitted to the user equipment through the first channel, and when the base station needs to change the secondary E-RNTI of the user equipment, transmit an updated secondary E-RNTI to the radio network controller, and notify the radio network controller to perform an alternation of the secondary E-RNTI, so as to enable the radio network controller to transmit the updated secondary E-RNTI to the user equipment.

With reference to the eighth aspect, in a seventh possible implementation of the eighth aspect, where the transmitter is specifically configured to configure a primary E-RNTI for the user equipment; or, configure a primary E-RNTI and a secondary E-RNTI for the user equipment.

With reference to the seventh possible implementation of the eighth aspect, in an eighth possible implementation of the eighth aspect, where the transmitter is further configured to transmit HARQ process information allocated for the user equipment to the radio network controller after an E-RNTI is configured for the user equipment by the processor.

With reference to the eighth possible implementation of the eighth aspect, in a ninth possible implementation of the eighth aspect, where the transmitter is further configured to transmit process state information of the user equipment to the radio network controller after transmitting HARQ process information allocated by the processor for the user equipment to the radio network controller, so as to enable the radio network controller to initially configure or reconfigure process state of the user equipment according to the process state information.

With reference to any one of the seventh to the ninth possible implementations of the eighth aspect, in a tenth possible implementation of the eighth aspect, where the transmitter is further configured to transmit process state information of the user equipment to the radio network controller after transmitting an absolute grant which is identified as the configured E-RNTI to the user equipment through the first channel.

With reference to any one of the first to the tenth possible implementations of the eighth aspect, in an eleventh possible implementation of the eighth aspect, where the receiver is further configured to, after the uplink enhanced dedicated channel configuration information of the user equipment transmitted by the radio network controller is received, and before the enhanced-radio network temporary identity E-RNTI is configured for the user equipment by the processor, receive an indication message transmitted by the radio network controller, wherein the indication message is used for indicating the base station to perform a message configuration for radio link establishment.

With reference to any one of the first to the tenth possible implementations of the eighth aspect, in a twelfth possible implementation of the eighth aspect, where the receiver is specifically configured to configure the E-RNTI for the user equipment according to current control reference information; wherein the current control reference information comprises any one or a combination of: a rate of the user equipment, a data block of the user equipment, a process number allocated for the user equipment, group information corresponding to the user equipment and current process usage situation of a cell.

The ninth aspect of the present invention provides a radio network controller, including:

a receiver, configured to receive a capability of a user equipment to support an uplink enhanced dedicated channel reported by the user equipment; and receive an E-RNTI which is configured by a base station for the user equipment transmitted by the base station, after a base station uplink enhanced dedicated channel configuration information of the user equipment is transmitted to the base station by a transmitter; wherein the E-RNTI configured by the base station for the user equipment comprises an E-RNTI allocated by the base station to a group to which the user equipment belongs;

the transmitter, configured to transmit the uplink enhanced dedicated channel configuration information of the user equipment to the base station; and transmit the E-RNTI configured by the base station for the user equipment to the user equipment after the E-RNTI which is configured by the base station for the user equipment and transmitted by the base station is received by the receiver, so as to enable the user equipment to monitor a first channel by using the configured E-RNTI, and activate or deactivate a hybrid automatic repeat request HARQ process according to an absolute grant received in the first channel.

With reference to the ninth aspect, in a first possible implementation of the ninth aspect, where the E-RNTI which is configured by the base station for the user equipment and received by the receiver comprises a first E-RNTI and a primary E-RNTI;

where, the E-RNTI allocated by the base station to the group to which the user equipment belongs is the first E-RNTI.

With reference to the first possible implementation of the ninth aspect, in a second possible implementation of the ninth aspect, where the receiver is further configured to receive an updated first E-RNTI transmitted by the base station after the E-RNTI configured by the base station for the user equipment is transmitted to the user equipment by the transmitter, and receive a notification for performing an alternation of the first E-RNTI transmitted by the base station;

the transmitter is further configured to transmit the updated first E-RNTI received by the receiver to the user equipment.

With reference to the ninth aspect, in a third possible implementation of the ninth aspect, where the E-RNTI which is configured by the base station for the user equipment and received by the receiver comprises a primary E-RNTI and a secondary E-RNTI;

where, the E-RNTI allocated by the base station to the group to which the user equipment belongs is the secondary E-RNTI.

With reference to the third possible implementation of the ninth aspect, in a fourth possible implementation of the ninth aspect, where the receiver is further configured to receive an updated secondary E-RNTI transmitted by the base station after the E-RNTI configured by the base station for the user equipment is transmitted to the user equipment by the transmitter, and receive a notification for performing an alternation of the secondary E-RNTI transmitted by the base station;

the transmitter is further configured to transmit the updated secondary E-RNTI received by the receiver to the user equipment.

With reference to the ninth aspect, in a fifth possible implementation of the ninth aspect, where the E-RNTI which is configured by the base station for the user equipment and received by the receiver includes a primary E-RNTI; or, the E-RNTI which is configured by the base station for the user equipment and received by the receiver includes a primary E-RNTI and a secondary E-RNTI.

With reference to the fifth possible implementation of the ninth aspect, in a sixth possible implementation of the ninth aspect, where the receiver is further configured to receive HARQ process information allocated by the base station for the user equipment after uplink enhanced dedicated channel configuration information of the user equipment is transmitted to the base station by the transmitter.

With reference to the sixth possible implementation of the ninth aspect, in a seventh possible implementation of the ninth aspect, where the radio network controller further includes: a processor;

the receiver is further configured to receive process state information allocated by the base station for the user equipment after receiving the HARQ process information allocated by the base station for the user equipment;

the processor is further configured to initially configure or reconfigure process state information of the user equipment according to the process state information received by the receiver.

With reference to any one of the fifth to the seventh possible implementations of the ninth aspect, in an eighth possible implementation of the ninth aspect, where the receiver is further configured to receive process state information of the user equipment transmitted by the base station after the E-RNTI configured by the base station for the user equipment is transmitted to the user equipment by the transmitter.

With reference to any one of the first to the eighth possible implementations of the ninth aspect, in a ninth possible implementation of the ninth aspect, where the transmitter is further configured to, after the uplink enhanced dedicated channel configuration information of the user equipment is transmitted to the base station, and before the E-RNTI which is configured by the base station for the user equipment and transmitted by the base station is received by the receiver, transmit an indication message to the base station, wherein the indication message is configured to indicate the base station to perform a message configuration for radio link establishment.

The technical effects of the present invention are: the user equipment reports to a radio network controller a capability of the user equipment to support an uplink enhanced dedicated channel, and receives a configuration message transmitted by the radio network controller, monitors a first channel by using the E-RNTI carried in the configuration message, where the E-RNTI carried in the configuration message includes an E-RNTI allocated to a group to which the user equipment belongs, then the user equipment activates or deactivates an HARQ process according to an absolute grant received in the first channel. Therefore, it can be achieved that all the user equipments belonging to one group are controlled according to the E-RNTI which is carried in the configuration message and allocated to the group to which the user equipment belongs, and then the operation of activating or deactivating the process of the group can be achieved, thereby reducing the utilization of E-AGCHs, improving the utilization efficiency of downlink code resources, and preventing the downlink throughput from being limited.

BRIEF DESCRIPTION OF DRAWINGS

To describe the technical solutions in embodiments of the present invention more clearly, the following briefly introduces the accompanying drawings needed for describing the embodiments. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

To make the objectives, technical solutions, and advantages of embodiments of the present invention clearer, the technical solution of the present invention is hereinafter described in detail with reference to the accompanying drawings. It is evident that the embodiments are only some exemplary embodiments of the present invention, and the present invention is not limited to such embodiments. Other embodiments obtained by those skilled in the art based on embodiments of the present invention all within the protection scope of the present invention.

Figure 1:
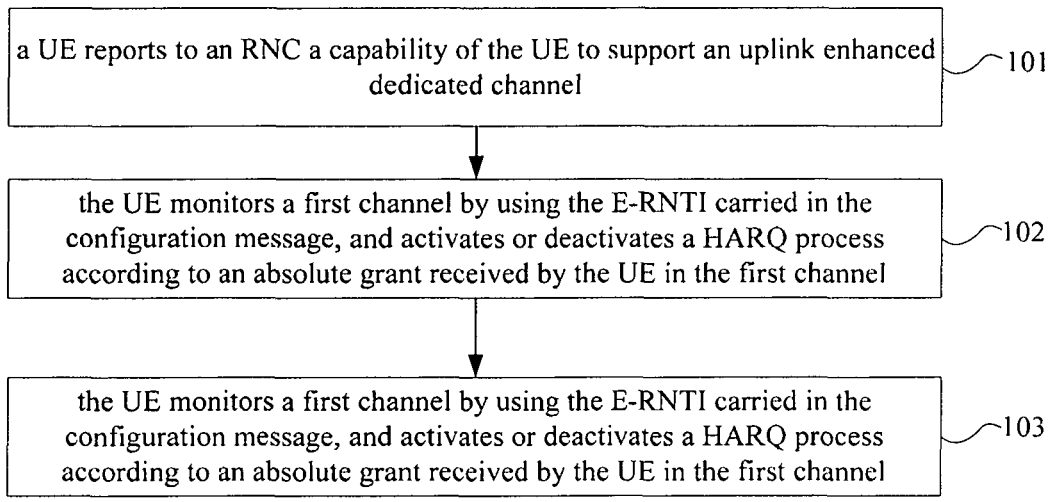
FIG. 1 is a schematic view of a method for group scheduling grant according to an embodiment of the present invention.

FIG. 1 is a schematic view of a method for group scheduling grant according to an embodiment of the present invention, as shown in FIG. 1, the method for group scheduling grant includes:

Step 101, a UE reports to a radio network controller (RNC for short) a capability of the UE to support an uplink enhanced dedicated channel.

Step 102, the UE receives a configuration message transmitted by the RNC, where the configuration message carries an E-RNTI; the E-RNTI carried in the configuration message includes an E-RNTI allocated to a group to which the user equipment belongs.

Step 103, the UE monitors a first channel by using the E-RNTI carried in the configuration message, and activates or deactivates a HARQ process according to an absolute grant received by the UE in the first channel.

Specifically, the absolute grant includes an activation indication or a deactivation indication of a HARQ process of the UE, where the activation indication of the HARQ process of the UE is a specific grant value.

In this embodiment, the first channel may be an E-AGCH, a common E-AGCH or a non-serving E-AGCH.

In the aforementioned embodiment, the UE reports to the RNC a capability of the UE to support an uplink enhanced dedicated channel, and receives a configuration message transmitted by the RNC, monitors a first channel by using the E-RNTI carried in the configuration message, where the E-RNTI carried in the configuration message may include an E-RNTI allocated to a group to which the UE belongs, then the UE activates or deactivates a HARQ process according to an absolute grant received in the first channel. Therefore, it can be achieved that all the UEs belonging to one group are controlled according to the E-RNTI which is allocated to the group to which the UE belongs and is carried in the configuration message, thus the operation of activating or deactivating the process of the group can be achieved, thereby reducing the utilization of E-AGCHs, improving the utilization efficiency of downlink code resources, and preventing the downlink throughput from being limited.

Figure 2:
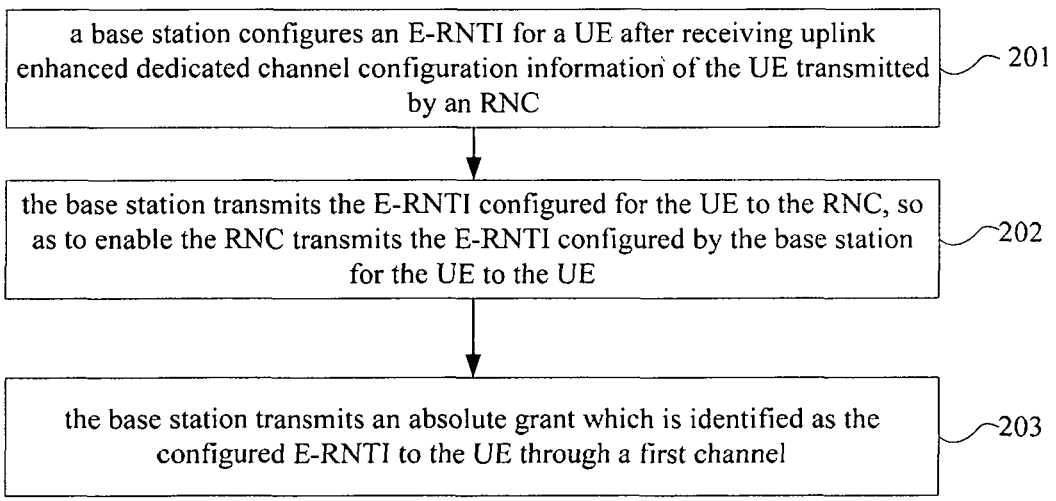
FIG. 2 is a schematic view of a method for group scheduling grant according to another embodiment of the present invention.

FIG. 2 is a schematic view of a method for group scheduling grant according to another embodiment of the present invention, as shown in FIG. 2, the method for group scheduling grant includes:

Step 201, a base station configures an E-RNTI for a UE after receiving uplink enhanced dedicated channel configuration information of the UE transmitted by an RNC.

Step 202, the base station transmits the E-RNTI configured for the UE to the RNC, so as to enable the RNC transmits the E-RNTI configured by the base station for the UE to the UE.

Where, the E-RNTI configured by the base station for the UE may include an E-RNTI allocated by the base station to a group to which the UE belongs.

Step 203, the base station transmits an absolute grant which is identified as the configured E-RNTI to the UE through a first channel.

In this embodiment, the first channel may be an E-AGCH, a common E-AGCH or a non-serving E-AGCH.

In this embodiment, after the base station receives uplink enhanced dedicated channel configuration information of a UE transmitted by a RNC, and before the base station configures an E-RNTI for the UE, the base station may also receive an indication message transmitted by the RNC, where the indication message is used for indicating the base station to perform a message configuration for radio link establishment. That is to say, the base station may configure the E-RNTI for the UE after receiving the indication message transmitted by the RNC.

Specifically, in an implementation of the embodiment, the configuring the E-RNTI for the UE may be: the base station configures a first E-RNTI and a primary E-RNTI for the UE; or, the base station configures a first E-RNTI, a primary E-RNTI and a secondary E-RNTI for the UE. In this implementation, the E-RNTI allocated by the base station to the group to which the UE belongs is the first E-RNTI, the first E-RNTI may be an additional primary E-RNTI, and may also be a group E-RNTI. In this implementation, the first E-RNTI is common, the base station configures a uniform first E-RNTI for all UEs in the group to which the UE belongs. In this way, all the UEs belonging to one group can be controlled according to the first E-RNTI, and thus the operation of activating or deactivating the process of the group can be achieved, thereby reducing the utilization of E-AGCHs, improving the utilization efficiency of downlink code resources, and preventing the downlink throughput from being limited.

In this implementation, the transmitting, by the base station, the absolute grant which is identified as the configured E-RNTI to the UE through the first channel may be: if current control demand is single control, the base station transmits an absolute grant which is identified as the primary E-RNTI to the UE through the first channel; or, if the current control demand is group control, the base station transmits an absolute grant which is identified as a first E-RNTI to the UE through the first channel.

Further, after the base station transmits the absolute grant which is identified as the configured E-RNTI to the UE through the first channel, if the base station needs to change the first E-RNTI of the UE, then the base station transmits an updated first E-RNTI to the RNC, and notifies the RNC to perform an alternation of the first E-RNTI, so as to enable the RNC to transmit the updated first E-RNTI to the UE.

In another implementation of this embodiment, the configuring the E-RNTI for the UE may be: the base station configures a first E-RNTI and a primary E-RNTI for the UE. In this implementation, the E-RNTI allocated by the base station to the group to which the UE belongs is a secondary E-RNTI, where the secondary E-RNTI is common, the base station configures a uniform secondary E-RNTI for all UEs in the group to which the UE belongs. In this way, all the UEs belonging to one group can be controlled according to the secondary E-RNTI, and thus the operation of activating or deactivating the process of the group can be achieved, thereby reducing the utilization of E-AGCHs, improving the utilization efficiency of downlink code resources, and preventing the downlink throughput from being limited.

In this implementation, the transmitting, by the base station, the absolute grant which is identified as the configured E-RNTI to the UE through the first channel may be: if current control demand is single control, the base station transmits an absolute grant which is identified as the primary E-RNTI to the UE through the first channel; or, if the current control demand is group control, the base station transmits an absolute grant which is identified as a secondary E-RNTI to the UE through the first channel.

Further, after the base station transmits the absolute grant which is identified as the configured E-RNTI to the UE through the first channel, if the base station needs to change a secondary E-RNTI of the UE, then the base station transmits an updated secondary E-RNTI to the RNC, and notifies the RNC to perform an alternation of the secondary E-RNTI, so as to enable the RNC to transmit the updated secondary E-RNTI to the UE.

In still another implementation of this embodiment, the configuring the E-RNTI for the UE may be: the base station configures a primary E-RNTI for the UE; or, the base station configures a primary E-RNTI and a secondary E-RNTI for the UE.

Further, after configuring the E-RNTI for the UE, the base station transmits HARQ process information allocated to the UE to the RNC. Where, the HARQ process information may be HARQ process configuration information which permits the UE to transmit data.

Further, after the base station transmits the HARQ process information allocated to the UE to the RNC, the base station transmits process state information of the UE to the RNC, so as to enable the RNC to initially configure or reconfigure process state of the UE according to the process state information.

Further, after the base station transmits the absolute grant which is identified as the configured E-RNTI to the UE through the first channel, the base station transmits process state information of the UE to the RNC, in this case, after receiving the process state information of the UE, the RNC may configure or may not configure the process state of the UE.

Where, the process state information of the UE may be HARQ process activation or deactivation state information of the UE, load information of a HARQ process, high low rate indication information and indicating grant information or a combination thereof.

In this embodiment, the configuring the E-RNTI for the UE may be: the base station configures the E-RNTI for the UE according to current control reference information; where the current control reference information includes any one or a combination of: a rate of the UE, a data block of the UE, a process number allocated to the UE, group information corresponding to the UE and current process usage situation of a cell.

In this embodiment, the absolute grant includes an activation indication or a deactivation indication of a HARQ process of the UE, where the activation indication of the HARQ process of the UE is a specific grant value.

In this embodiment, after the base station receives uplink enhanced dedicated channel configuration information of a UE transmitted by an RNC, the base station configures an E-RNTI for the UE, then the base station transmits the E-RNTI configured for the UE to the RNC, and the RNC transmits the E-RNTI configured by the base station for the UE to the UE, where, the E-RNTI configured by the base station for the UE may include an E-RNTI allocated by the base station to a group to which the UE belongs; therefore, it can be achieved that all the UEs belonging to one group are controlled according to the E-RNTI allocated by the base station to the group to which the UE belongs, and thus the operation of activating or deactivating the process of the group can be achieved, thereby reducing the utilization of E-AGCHs, improving the utilization efficiency of downlink code resources, and preventing the downlink throughput from being limited.

Figure 3:
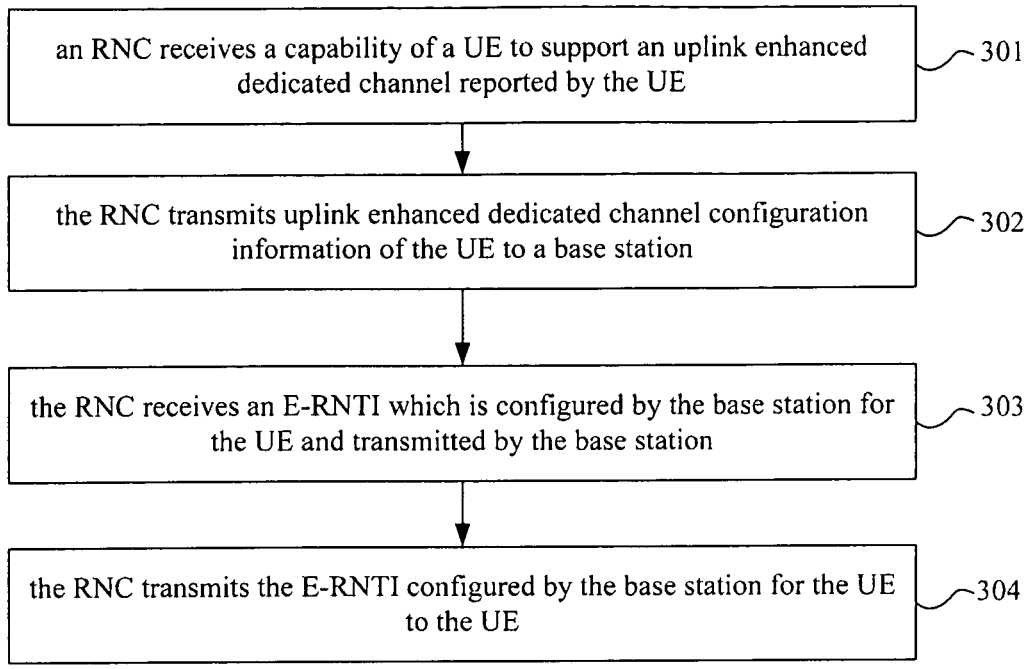
FIG. 3 is a schematic view of a method for group scheduling grant according to still another embodiment of the present invention.
Figure 13:
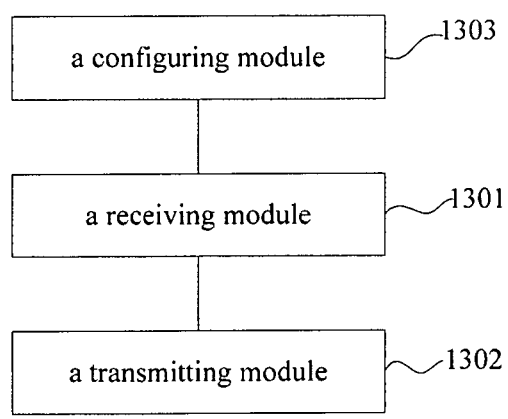
FIG. 13 is a schematic structural diagram of a radio network controller according to an embodiment of the present invention.

FIG. 3 is a schematic view of a method for group scheduling grant according to still another embodiment of the present invention, as shown in FIG. 13, the method for group scheduling grant may include:

Step 301, an RNC receives a capability of a UE to support an uplink enhanced dedicated channel reported by the UE.

Step 302, the RNC transmits uplink enhanced dedicated channel configuration information of the UE to a base station.

In this embodiment, after the RNC receives the capability of the UE to support an uplink enhanced dedicated channel reported by the UE, the RNC transmits the uplink enhanced dedicated channel configuration information of the UE to a base station. Where, the uplink enhanced dedicated channel configuration information of the UE includes information such as a frame offset of an uplink enhanced dedicated channel supported by the UE.

Step 303, the RNC receives an E-RNTI which is configured by the base station for the UE and transmitted by the base station.

Where the E-RNTI configured by the base station for the UE includes an E-RNTI allocated by the base station to a group to which the UE belongs.

Step 304, the RNC transmits the E-RNTI configured by the base station for the UE to the UE, so as to enable the UE to monitor a first channel by using the configured E-RNTI, and activates or deactivates a HARQ process according to an absolute grant received in the first channel.

In this embodiment, the first channel may be an E-AGCH, a common E-AGCH or a non-serving E-AGCH.

In this embodiment, further, after the step 301 and before the step 303, the RNC transmits an indication message to the base station, where the indication message is used for indicating the base station to perform a message configuration for radio link establishment. That is to say, the base station may configure the E-RNTI for the UE after receiving the indication message transmitted by the RNC.

In an implementation of this embodiment, the E-RNTI configured by the base station for the UE includes a first E-RNTI and a primary E-RNTI; or, the E-RNTI configured by the base station for the UE includes a first E-RNTI, a primary E-RNTI and a secondary E-RNTI. In this implementation, the E-RNTI allocated by the base station to the group to which the UE belongs is the first E-RNTI, the first E-RNTI may be an additional primary E-RNTI, and may also be a group E-RNTI. In this implementation, the first E-RNTI is common, the base station configures a uniform first E-RNTI for all UEs in the group to which the UE belongs. In this way, all the UEs belonging to one group can be controlled according to the first E-RNTI, and thus the operation of activating or deactivating the process of the group can be achieved, thereby reducing the utilization of E-AGCHs, improving the utilization efficiency of downlink code resources, and preventing the downlink throughput from being limited.

Hereinafter, after the E-RNTI configured by the base station for the UE is transmitted to the UE, the RNC may also receive an updated first E-RNTI transmitted by the base station, and receives a notification for performing an alternation of the first E-RNTI transmitted by the base station; then, the RNC transmits the updated first E-RNTI to the UE.

In another implementation of this embodiment, the E-RNTI configured by the base station for the UE includes a primary E-RNTI and a secondary E-RNTI. In this implementation, the E-RNTI allocated by the base station to a group to which the UE belongs is a secondary E-RNTI; where the secondary E-RNTI is common, the base station configures a uniform secondary E-RNTI for all UEs in the group to which the UE belongs. In this way, all the UEs belonging to one group can be controlled according to the secondary E-RNTI, and thus the operation of activating or deactivating the process of the group can be achieved, thereby reducing the utilization of E-AGCHs, improving the utilization efficiency of downlink code resources, and preventing the downlink throughput from being limited.

Further, after the E-RNTI configured by the base station for the UE is transmitted to the UE, the RNC may also receive an updated secondary E-RNTI transmitted by the base station, and receives a notification for performing an alternation of the secondary E-RNTI transmitted by the base station; then, the RNC transmits the updated secondary E-RNTI to the UE.

In still another implementation of this embodiment, the E-RNTI configured by the base station for the UE includes a primary E-RNTI; or, the E-RNTI configured by the base station for the UE includes a primary E-RNTI and a secondary E-RNTI.

Further, after the RNC transmits uplink enhanced dedicated channel configuration information of the UE to the base station, the RNC may receive HARQ process information allocated by the base station to the UE. Where, the HARQ process information may be HARQ process configuration information which permits the UE to transmit data.

Further, after the RNC receives the HARQ process information allocated by the base station to the UE, the RNC may receive process state information of the UE transmitted by the base station; then the RNC initially configures or reconfigures process state of the UE according to the process state information.

Further, after transmitting the E-RNTI configured by the base station for the UE to the UE, the RNC may also receives process state information of the UE transmitted by the base station, in this case, after receiving the process state information of the UE, the RNC may configure or may not configure the process state of the UE.

Where, the process state information of the UE may be HARQ process activation or deactivation state information of the UE, load information of a HARQ process, high low rate indication information and indicating grant information or a combination thereof.

In this embodiment, after an RNC receives a capability of a UE to support a uplink enhanced dedicated channel reported by the UE, the RNC transmits uplink enhanced dedicated channel configuration information of the UE to a base station, then receives the E-RNTI which is configured by the base station for the UE and transmitted by the base station, and transmits the E-RNTI configured by the base station for the LTE to the UE, where, the E-RNTI configured by the base station for the UE may include an E-RNTI allocated to a group to which the UE belongs, therefore, it can be achieved that all the UEs belonging to one group are controlled according to the E-RNTI allocated to the group to which the UE belongs, and thus the operation of activating or deactivating the process of the group can be achieved, thereby reducing the utilization of E-AGCHs, improving the utilization efficiency of downlink code resources, and preventing the downlink throughput from being limited.

Figure 4:
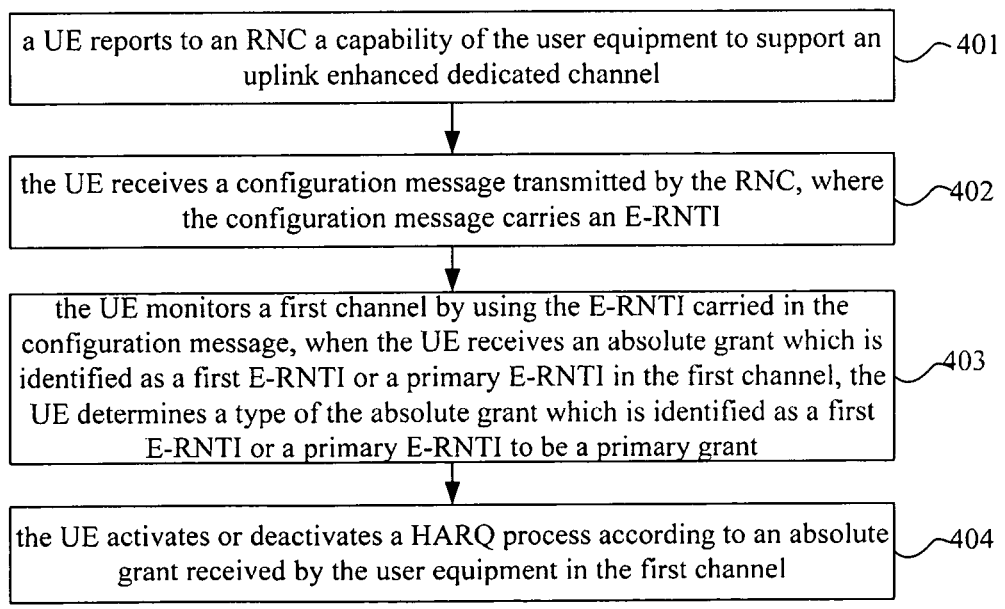
FIG. 4 is a schematic view of a method for group scheduling grant according to still another embodiment of the present invention.

FIG. 4 is a schematic view of a method for group scheduling grant according to still another embodiment of the present invention, as shown in FIG. 4, the method for group scheduling grant may include:

Step 401, a UE reports to an RNC a capability of the user equipment to support an uplink enhanced dedicated channel.

Specifically, the reporting, by the UE, to the RNC the capability of the user equipment to support the uplink enhanced dedicated channel may be: the UE reports to the RNC a capability of the UE to support receiving an absolute grant which is identified as a first E-RNTI during an uplink enhanced dedicated channel operation.

Specifically, the UE may report, via a radio resource control (RRC for short) connection establishment request or an RRC connection establishment complete message, to the RNC a capability of the UE to support a reception of an absolute grant which is identified as a first E-RNTI.

Step 402, the UE receives a configuration message transmitted by the RNC, where the configuration message carries an E-RNTI.

Specifically, the E-RNTI carried in the configuration message includes a first E-RNTI and a primary E-RNTI; or, the E-RNTI carried in the configuration message includes a first E-RNTI, a primary E-RNTI and a secondary E-RNTI. Where, the first E-RNTI is the E-RNTI allocated by the base station to the group to which the UE belongs, the first E-RNTI may be an additional primary E-RNTI, and may also be a group E-RNTI. In this implementation, the first E-RNTI is common, the base station configures a uniform first E-RNTI for all UEs in the group to which the UE belongs. In this way, all the UEs belonging to one group can be controlled according to the first E-RNTI, and thus the operation of activating or deactivating the process of the group can be achieved, thereby reducing the utilization of E-AGCHs, improving the utilization efficiency of downlink code resources, and preventing the downlink throughput from being limited.

Where, the configuration message may be an RRC message such as a radio bearer establishment message, a radio bearer reconfiguration message or an RRC connection establishment message.

Step 403, the UE monitors a first channel by using the E-RNTI carried in the configuration message, when the UE receives an absolute grant which is identified as a first E-RNTI or a primary E-RNTI in the first channel, the UE determines a type of the absolute grant which is identified as a first E-RNTI or a primary E-RNTI to be a primary grant.

In this embodiment, the first channel may be an E-AGCH, a common E-AGCH or a non-serving E-AGCH.

Step 404, the UE activates or deactivates a HARQ process according to an absolute grant received by the user equipment in the first channel.

Specifically, in an specific implementation of this embodiment, the activating or deactivating, by the UE, the HARQ process according to the absolute grant received by the user equipment in the first channel may be: if an identification of the absolute grant received by the UE in the first channel is a first E-RNTI, and an absolute grant value of the absolute grant is a deactivation command, then when an absolute grant scope of the absolute grant is per HARQ process and a 2 milliseconds TTI is configured, the UE deactivates a HARQ process corresponding to a HARQ process number which is corresponding to a current TTI; or, when the absolute grant scope of the absolute grant is all HARQ processes and a 2 milliseconds TTI is configured but a secondary E-RNTI is not configured, the UE deactivates all the HARQ processes; or, when the absolute grant scope of the absolute grant is all HARQ processes and a secondary E-RNTI is configured, the UE activates all the HARQ processes, sets a service grant as storing a second grant value, and sets a validity of a primary grant to be false.

In another specific implementation of this embodiment, the activating or deactivating, by the UE, the HARQ process according to the absolute grant received by the user equipment in the first channel may be: if an identification of the absolute grant received by the UE in the first channel is a first E-RNTI, and an absolute grant value of the absolute grant is not a deactivation command, then when an absolute grant scope of the absolute grant is per HARQ process, the UE activates a HARQ process corresponding to a HARQ process number which is corresponding to a current TTI; or, when the absolute grant scope of the absolute grant is all HARQ processes, the UE activates all the HARQ processes.

In still another specific implementation of this embodiment, the activating or deactivating, by the UE, the HARQ process according to the absolute grant received by the user equipment in the first channel may be: if an identification of the absolute grant received by the UE in the first channel is a first E-RNTI, and an absolute grant value of the absolute grant is not a deactivation command, then the UE activates a HARQ process corresponding to a HARQ process number which is corresponding to a current TTI, and deactivates all HARQ processes except the HARQ process corresponding to the HARQ process number which is corresponding to the current TTI.

Besides, in still another implementation of this embodiment, if an identification of the absolute grant received by the UE in the first channel is a first E-RNTI, and an absolute grant value of the absolute grant is not a deactivation command, then the UE sets a validity of a primary grant to be true.

In still another implementation of this embodiment, if an identification of the absolute grant received by the UE in the first channel is a first E-RNTI, and an absolute grant value of the absolute grant is not a deactivation command, when a timer of the absolute grant is in an untriggered state, the UE starts the timer, or, when the timer of the absolute grant is in a triggered state, the UE resets the timer.

In still another implementation of this embodiment, if an identification of the absolute grant received by the UE in the first channel is a first E-RNTI, a primary E-RNTI or a validity of a primary grant is set to be false, and an absolute grant value of the absolute grant is not a deactivation command, then when the absolute grant value of the absolute grant is not a zero grant command, the UE sets a service grant to be a maximum value of the absolute grant value and a minimum configuration service grant value; or, when the absolute grant value of the absolute grant is a zero grant command, the UE sets a service grant to be a zero grant.

In the aforementioned embodiment, the UE reports to the radio network controller a capability of the UE to support receiving an absolute grant which is identified as a first E-RNTI during an uplink enhanced dedicated channel operation, and receives a configuration message transmitted by the RNC, then the UE monitors a first channel by using the E-RNTI carried in the configuration message, where the E-RNTI carried in the configuration message may include a first E-RNTI allocated to a group to which the UE belongs; then the UE activates or deactivates a HARQ process according to an absolute grant received by the UE in the first channel. Therefore, it can be achieved that all the UEs belonging to one group are controlled according to the first E-RNTI which is carried in the configuration message and allocated to the group to which the aforementioned UE belongs, and thus the operation of activating or deactivating the process of the group can be achieved, thereby reducing the utilization of E-AGCHs, improving the utilization efficiency of downlink code resources, and preventing the downlink throughput from being limited.

Figure 5:
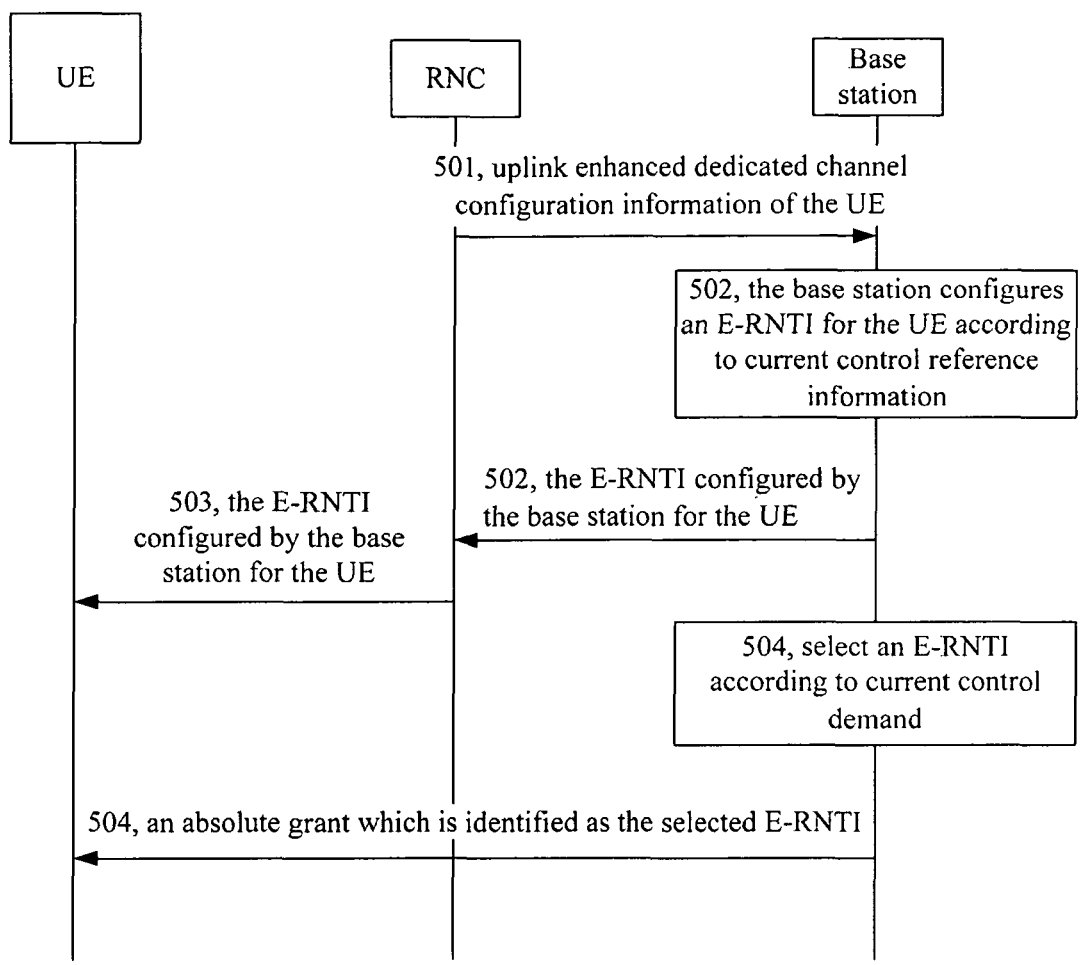
FIG. 5 is a schematic view of a method for group scheduling grant according to still another embodiment of the present invention.

FIG. 5 is a schematic view of a method for group scheduling grant according to still another embodiment of the present invention, as shown in FIG. 5, the method for group scheduling grant may include:

Step 501, when a RNC receives a capability, which is reported by a UE, of the UE to support receiving an absolute grant which is identified as a first E-RNTI during an uplink enhanced dedicated channel operation, the RNC transmits uplink enhanced dedicated channel configuration information of the UE to a base station via a first message.

Where, the uplink enhanced dedicated channel configuration information of the UE includes information such as a frame offset of an uplink enhanced dedicated channel supported by the UE.

Specifically, the first message may be a radio link establishment message, a radio link adding message or a radio link reconfiguration message and etc.

Step 502, the base station, configures an E-RNTI for the UE according to current control reference information, and the base station notifies the E-RNTI configured by the base station for the UE to the RNC via a second message.

Specifically, the E-RNTI configured by the base station for the UE may include a first E-RNTI and a primary E-RNTI; or, the E-RNTI configured by the base station for the UE may include a first E-RNTI, a primary E-RNTI and a secondary E-RNTI.

Where, a first E-RNTI is an E-RNTI allocated by the base station to a group to which the UE belongs, the first E-RNTI may be an additional primary E-RNTI, and may also be a group E-RNTI. In this embodiment, the first E-RNTI is common, the base station configures a uniform first E-RNTI for all UEs in the group to which the UE belongs. In this way, all the UEs belonging to one group can be controlled according to the first E-RNTI, and thus the operation of activating or deactivating the process of the group can be achieved, thereby reducing the utilization of E-AGCHs, improving the utilization efficiency of downlink code resources, and preventing the downlink throughput from being limited.

Where, the current control reference information includes any one or a combination of: a rate of the UE, a data block of the UE, a process number allocated to the UE, group information corresponding to the UE and current process usage situation of a cell.

Specifically, the second message may be a radio link establishment response message, a radio link adding response message, a radio link reconfiguration response message or a radio link parameter updating message and etc.

Step 503, when the RNC receives the E-RNTI configured by the base station for the UE, the RNC transmits the E-RNTI configured by the base station for the UE to the UE via a third message.

Where, the third message may be an RRC message such as a radio bearer establishment message, a radio bearer reconfiguration message and an RRC connection establishment message.

Step 504, the base station selects an E-RNTI according to current control demand, and transmits an absolute grant which is identified as the selected E-RNTI to the UE through the first channel.

Specifically, if the current control demand is single control, then the base station selects the primary E-RNTI and transmits an absolute grant which is identified as the primary E-RNTI to the UE through the first channel; or, if the current control demand is group control, then the base station selects the first E-RNTI and transmits an absolute grant which is identified as the first E-RNTI to the UE through the first channel.

Hereinafter, in this embodiment, after step 504, if the base station needs to change the first E-RNTI of the UE, then the base station transmits an updated first E-RNTI to the RNC via the second message, and notifies the RNC to perform an alternation of the first E-RNTI. Then, the RNC will transmit the updated first E-RNTI to the UE via the third message.

In this embodiment, in step 501, after the RNC transmits the uplink enhanced dedicated channel configuration information of the UE to the base station via the first message, the base station may notify the 2 milliseconds HARQ process usage information to the RNC via the second message. Where, the specific process usage information may be that each process is activated or deactivated, or whether each process is a zero grant or not.

In this embodiment, after step 501, and before step 502, the RNC may transmits an indication message to the base station, where the indication message is used for indicating the base station to perform a message configuration for a radio link establishment. That is to say, the base station may configure the E-RNTI for the UE after receiving the indication message transmitted by the RNC.

The embodiment can achieve that all the UEs belonging to one group can be controlled according to the first E-RNTI allocated by the base station to the group to which the UE belongs, and then achieve the operation of activating or deactivating the process of the group, thereby reducing the utilization of E-AGCHs, improving the utilization efficiency of downlink code resources, and preventing the downlink throughput from being limited.

Figure 6:
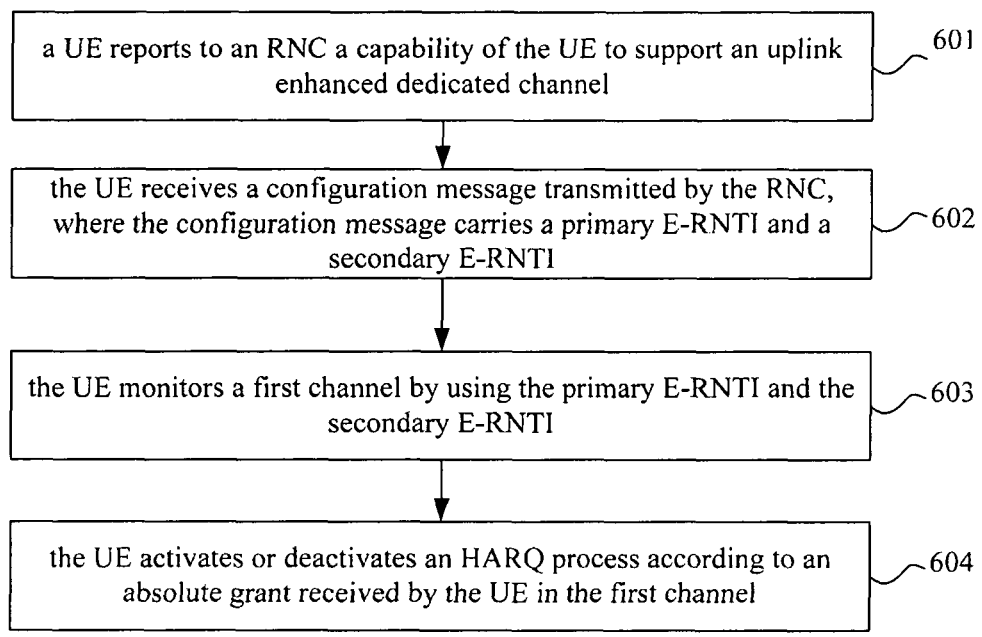
FIG. 6 is a schematic view of a method for group scheduling grant according to still another embodiment of the present invention.

FIG. 6 is a schematic view of a method for group scheduling grant according to still another embodiment of the present invention, as shown in FIG. 6, the method for group scheduling grant may include:

Step 601, a UE reports to an RNC a capability of the UE to support an uplink enhanced dedicated channel.

In this embodiment, the UE reports to the RNC a capability of the UE to support an uplink enhanced dedicated channel, namely, the UE implicitly notifies the RNC of a capacity of the UE to support an absolute grant which is identified as a primary E-RNTI and a secondary E-RNTI.

Step 602, the UE receives a configuration message transmitted by the RNC, where the configuration message carries a primary E-RNTI and a secondary E-RNTI.

Where, the secondary E-RNTI is an E-RNTI allocated by a base station to a group to which the UE belongs, the secondary E-RNTI is common, the base station configures a uniform secondary E-RNTI for all UEs in the group to which the UE belongs. In this way, all the UEs belonging to one group can be controlled according to the secondary E-RNTI, and thus the operation of activating or deactivating the process of the group can be achieved, thereby reducing the utilization of E-AGCHs, improving the utilization efficiency of downlink code resources, and preventing the downlink throughput from being limited.

Specifically, the configuration message may be an RRC message such as a radio bearer establishment message, a radio bearer reconfiguration message or an RRC connection establishment message.

Step 603, the UE monitors a first channel by using the primary E-RNTI and the secondary E-RNTI.

In this embodiment, the first channel may be an E-AGCH, a common E-AGCH or a non-serving E-AGCH.

Step 604, the UE activates or deactivates an HARQ process according to an absolute grant received by the UE in the first channel.

Specifically, when the UE receives an absolute grant which is identified as the secondary E-RNTI in the first channel, the HE determines an effect process scope of the absolute grant which is identified as the secondary E-RNTI according to an absolute grant scope of the absolute grant.

In an implementation of this embodiment, the activating or deactivating, by the UE, the HARQ process according to the absolute grant received by the UE in the first channel may be: if an identification of the absolute grant received by the UE in the first channel is a secondary E-RNTI, and an absolute grant value of the absolute grant is a deactivation command, then when an absolute grant scope of the absolute grant is per HARQ process and a 2 milliseconds TTI is configured, the UE deactivates a HARQ process corresponding to a HARQ process number which is corresponding to a current TTI; or, when the absolute grant scope of the absolute grant is all HARQ processes and a 2 milliseconds TTI is configured, the UE deactivates all the HARQ processes;

In another implementation of this embodiment, the activating or deactivating, by the UE, the HARQ process according to the absolute grant received by the UE in the first channel may be: if an identification of the absolute grant received by the user equipment in the first channel is a secondary E-RNTI, and an absolute grant value of the absolute grant is not a deactivation command, then when an absolute grant scope of the absolute grant is per HARQ process, the UE activates a HARQ process corresponding to a HARQ process number which is corresponding to a current TTI; or, when the absolute grant scope of the absolute grant is all HARQ processes, the UE activates all the HARQ processes.

In another implementation of this embodiment, the activating or deactivating, by the UE, the HARQ process according to the absolute grant received by the UE in the first channel may be: if an identification of the absolute grant received by the UE in the first channel is a secondary E-RNTI, and an absolute grant value of the absolute grant is not a deactivation command, then the UE activates a HARQ process corresponding to a HARQ process number which is corresponding to a current TTI, and deactivates all HARQ processes except the HARQ process corresponding to the HARQ process number which is corresponding to the current TTI.

Besides, in still another implementation of this embodiment, if an identification of the absolute grant received by the UE in the first channel is a secondary E-RNTI, and an absolute grant value of the absolute grant is not a deactivation command, then when the absolute grant value of the absolute grant is not a zero grant command, the UE sets a service grant to be a maximum value of the absolute grant value and a minimum configuration service grant value; or, when the absolute grant value of the absolute grant is a zero grant command, the UE sets a service grant to be a zero grant.

In still another implementation of this embodiment, if an identification of the absolute grant received by the UE in the first channel is a secondary E-RNTI, and an absolute grant value of the absolute grant is not a deactivation command, then when a timer of the absolute grant is in an untriggered state, the UE starts the timer; or, when the timer of the absolute grant is in a triggered state, the UE resets the timer.

In the aforementioned embodiment, the UE reports to an RNC a capability of the UE to support an uplink enhanced dedicated channel, and receives a configuration message transmitted by the RNC, then the UE monitors a first channel by using the E-RNTI carried in the configuration message, where the E-RNTI carried in the configuration message may include a secondary E-RNTI allocated by a base station to a group to which the UE belongs. Then, the UE activates or deactivates a HARQ process according to an absolute grant received by the UE in the first channel. Therefore, it can be achieved that all the UEs belonging to one group can be controlled according to the secondary E-RNTI carried in the configuration message, and thus the operation of activating or deactivating the process of the group can be achieved, thereby reducing the utilization of E-AGCHs, improving the utilization efficiency of downlink code resources, and preventing the downlink throughput from being limited.

Figure 7:
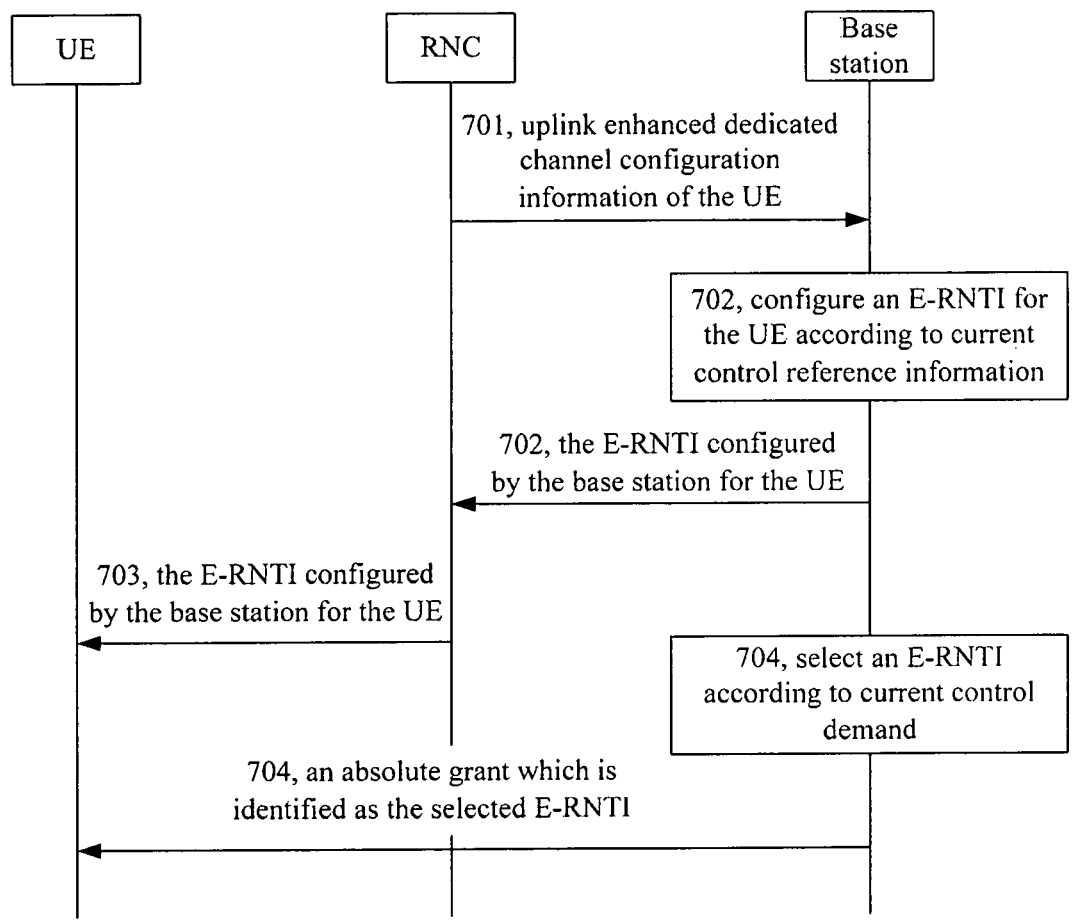
FIG. 7 is a schematic view of a method for group scheduling grant according to still another embodiment of the present invention.

FIG. 7 is a schematic view of a method for group scheduling grant according to still another embodiment of the present invention, as shown in FIG. 7, the method for group scheduling grant may include:

Step 701, when an RNC receives a capability, which is reported by a UE, of the UE to support an uplink enhanced dedicated channel, the RNC transmits uplink enhanced dedicated channel configuration information of the UE to a base station via a first message.

Where, the uplink enhanced dedicated channel configuration information of the UE includes information such as a frame offset of an uplink enhanced dedicated channel supported by the UE.

Specifically, the first message may be a radio link establishment message, a radio link adding message or a radio link reconfiguration message and etc.

Step 702, the base station configures an E-RNTI for the UE according to current control reference information, and the base station notifies the E-RNTI configured by the base station for the UE to the RNC via a second message.

Specifically, the E-RNTI configured by the base station for the UE may include a primary E-RNTI and a secondary E-RNTI, where the secondary E-RNTI is common, the base station configures a uniform secondary E-RNTI for all UEs in the group to which the UE belongs. In this way, all the UEs belonging to one group can be controlled according to the secondary E-RNTI, and thus the operation of activating or deactivating the process of the group can be achieved, thereby reducing the utilization of E-AGCHs, improving the utilization efficiency of downlink code resources, and preventing the downlink throughput from being limited.

Where, the current control reference information includes any one or a combination of: a rate of the UE, a data block of the UE, a process number allocated to the UE, group information corresponding to the UE and current process usage situation of a cell.

Specifically, the second message may be a radio link establishment response message, a radio link adding response message, a radio link reconfiguration response message or a radio link parameter updating message and etc.

Step 703, when the RNC receives the E-RNTI configured by the base station for the UE, the RNC transmits the E-RNTI configured by the base station for the UE to the UE via a third message.

Where; the third message may be an RRC message such as a radio bearer establishment message, a radio bearer reconfiguration message and an RRC connection establishment message.

Step 704, the base station selects an E-RNTI according to current control demand, and transmits an absolute grant which is identified as the selected E-RNTI to the UE through the first channel.

Specifically, if the current control demand is single control, then the base station selects the primary E-RNTI and transmits an absolute grant which is identified as the primary E-RNTI to the UE through the first channel; or, if the current control demand is group control, then the base station selects the secondary E-RNTI and transmits an absolute grant which is identified as the secondary E-RNTI to the UE through the first channel.

Further, after step 704, if the base station needs to change the secondary E-RNTI of the UE, then the base station transmits an updated first E-RNTI to the RNC via the second message, and notifies the RNC to perform an alternation of the secondary E-RNTI. Then the RNC may transmit the updated secondary E-RNTI to the UE via the third message.

In this embodiment, after the RNC transmits the uplink enhanced dedicated channel configuration information of the UE to the base station via the first message, and before the RNC notifies the E-RNTI configured by the base station for the UE to the RNC via the second message, the RNC may further transmit an indication message to the base station, where the indication message is used for indicating the base station to perform a message configuration for radio link establishment. That is to say, the base station may configure the E-RNTI for the UE after receiving the indication message transmitted by the RNC.

The embodiment can achieve that all the UEs belonging to one group can be controlled according to a secondary E-RNTI allocated by, the base station to the group to which the UE belongs, and thus the operation of activating or deactivating the process of the group can be achieved, thereby reducing the utilization of E-AGCHs, improving the utilization efficiency of downlink code resources, and preventing the downlink throughput from being limited.

Figure 8:
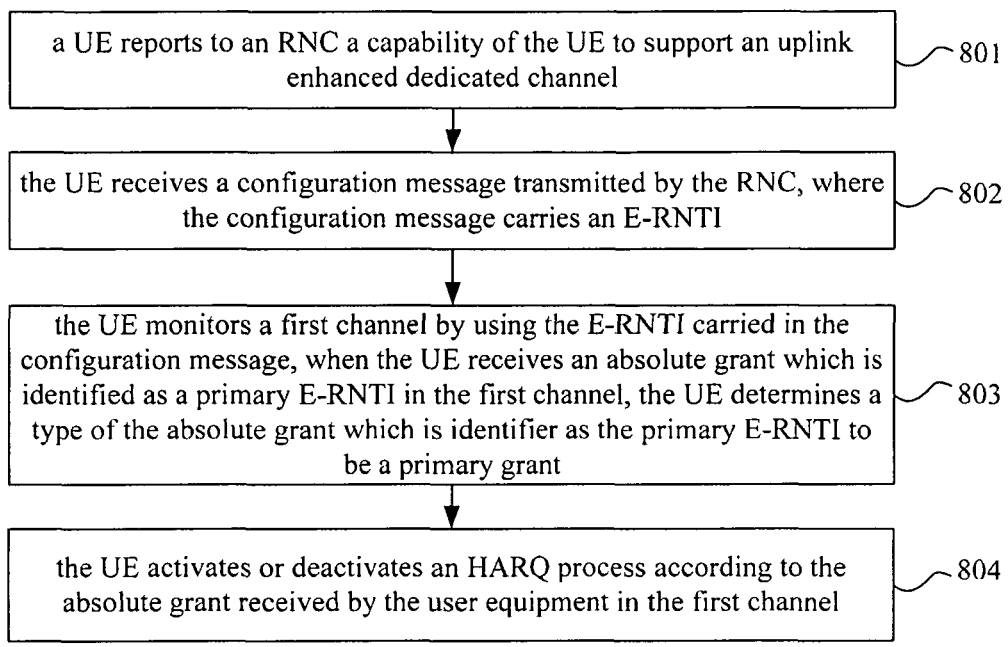
FIG. 8 is a schematic view of a method for group scheduling grant according to still another embodiment of the present invention.

FIG. 8 is a schematic view of a method for group scheduling grant according to still another embodiment of the present invention, as shown in FIG. 8, the method for group scheduling grant may include:

Step 801, a UE reports to an RNC a capability of the UE to support an uplink enhanced dedicated channel.

In this embodiment, the UE reports to the RNC a capability of the UE to support an uplink enhanced dedicated channel, namely, the UE implicitly notifies the RNC of a capacity of the UE to support an absolute grant which is identified as a primary E-RNTI or a primary E-RNTI and a secondary E-RNTI.

Step 802, the UE receives a configuration message transmitted by the RNC, where the configuration message carries an E-RNTI.

In this embodiment, the configuration message may be an RRC message such as a radio bearer establishment message, a radio bearer reconfiguration message or an RRC connection establishment message.

Where the E-RNTI carried in the configuration message includes a primary E-RNTI; or, the E-RNTI carried in the configuration message includes a primary E-RNTI and a secondary E-RNTI.

Step 803, the UE monitors a first channel by using the E-RNTI carried in the configuration message, when the UE receives an absolute grant which is identified as a primary E-RNTI in the first channel, the UE determines a type of the absolute grant which is identifier as the primary E-RNTI to be a primary grant.

Step 804, the UE activates or deactivates an HARQ process according to the absolute grant received by the user equipment in the first channel.

Specifically, in an specific implementation of this embodiment, the activating or deactivating, by the UE, the HARQ process according to the absolute grant received by the user equipment in the first channel may be: if an identification of the absolute grant received by the UE in the first channel is a primary E-RNTI, and an absolute grant value of the absolute grant is a deactivation command, then when an absolute grant scope of the absolute grant is per HARQ process and a 2 milliseconds TTI is configured, the UE deactivates a HARQ process corresponding to a HARQ process number which is corresponding to a current TTI; or, when the absolute grant scope of the absolute grant is all HARQ processes and a 2 milliseconds TTI is configured but a secondary E-RNTI is not configured, the UE deactivates all the HARQ processes; or, when the absolute grant scope of the absolute grant is all HARQ processes and a secondary E-RNTI is configured, the UE activates all the HARQ processes, sets a service grant as storing a second grant value, and sets a validity of a primary grant to be false.

In another specific implementation of this embodiment, the activating or deactivating, by the UE, the HARQ process according to the absolute grant received by the user equipment in the first channel may be: if an identification of the absolute grant received by the UE in the first channel is a primary E-RNTI, and an absolute grant value of the absolute grant is not a deactivation command, then when an absolute grant scope of the absolute grant is per HARQ process, the UE activates a HARQ process corresponding to a HARQ process number which is corresponding to a current TTI; or, when the absolute grant scope of the absolute grant is all HARQ processes, the UE activates all the HARQ processes.

Besides, in still another implementation of this embodiment, if an identification of the absolute grant received by the UE in the first channel is a primary E-RNTI, and an absolute grant value of the absolute grant is not a deactivation command, then the UE sets a validity of a primary grant to be true.

In still another implementation of this embodiment, if an identification of the absolute grant received by the UE in the first channel is a primary E-RNTI, and an absolute grant value of the absolute grant is not a deactivation command, then when a timer of the absolute grant is in an untriggered state, the UE starts the timer, or, when the timer of the absolute grant is in a triggered state, the UE resets the timer.

In still another implementation of this embodiment, if an identification of the absolute grant received by the UE in the first channel is a primary E-RNTI or a validity of a primary grant is set to be false, and an absolute grant value of the absolute grant is not a deactivation command, then when the absolute grant value of the absolute grant is not a zero grant command, the UE sets a service grant to be a maximum value of the absolute grant value and a minimum configuration service grant value; or, when the absolute grant value of the absolute grant is a zero grant command, the UE sets a service grant to be a zero grant.

In the aforementioned embodiment, the UE reports to an RNC a capability of the UE to support an uplink enhanced dedicated channel, and receives a configuration message transmitted by the RNC, then the UE monitors a first channel by using the E-RNTI carried in the configuration message, and the UE activates or deactivates a HARQ process according to an absolute grant received by the UE in the first channel, thereby achieving the operation of activating or deactivating the process.

Figure 9:
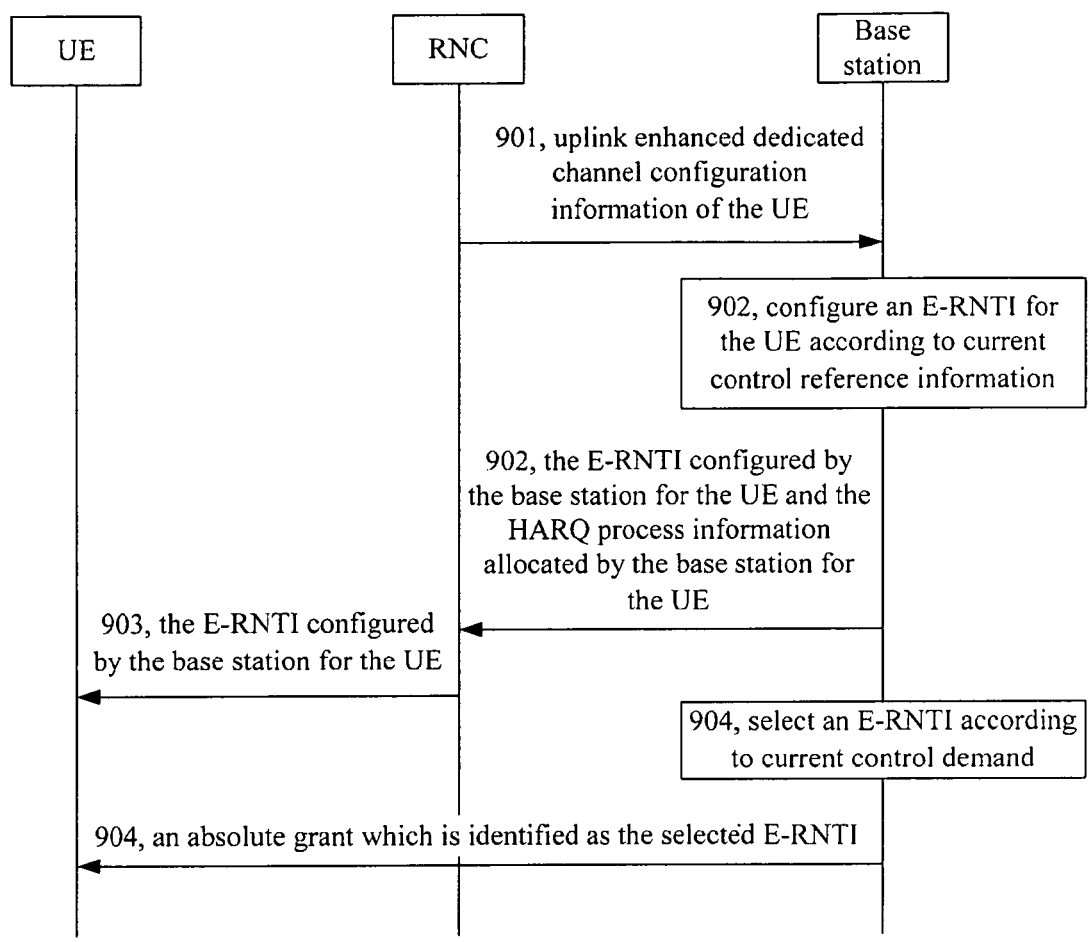
FIG. 9 is a schematic view of a method for group scheduling grant according to still another embodiment of the present invention.

FIG. 9 is a schematic view of a method for group scheduling grant according to still another embodiment of the present invention, as shown in FIG. 9, the method for group scheduling grant may include:

Step 901, when an RNC receives a capability, which is reported by a UE, of the UE to support an uplink enhanced dedicated channel, the RNC transmits uplink enhanced dedicated channel configuration information of the UE to a base station via a first message.

Specifically, the first message may be a radio link establishment message, a radio link adding message or a radio link reconfiguration message and etc.

Step 902, the base station configures an E-RNTI for the UE according to current control reference information, and the base station transmits the E-RNTI configured by the base station for the UE and HARQ process information allocated by the base station for the UE to the RNC via a second message.

Where, the HARQ process information may be HARQ process configuration information which permits the UE to transmit data.

Specifically, the E-RNTI configured by the base station for the UE may include a primary E-RNTI; or, the E-RNTI configured by the base station for the UE may include a primary E-RNTI and a secondary E-RNTI.

Where, the current control reference information includes any one or a combination of: a rate of the UE, a data block of the UE, a process number allocated to the UE, group information corresponding to the UE and current process usage situation of a cell.

Specifically, the second message may be a radio link establishment response message, a radio link adding response message, a radio link reconfiguration response message or a radio link parameter updating message and etc.

Step 903, when the RNC receives the E-RNTI configured by the base station for the UE, the RNC transmits the E-RNTI configured by the base station for the UE to the UE via a third message.

Specifically, the third message may be an RRC message such as a radio bearer establishment message, a radio bearer reconfiguration message and an RRC connection establishment message.

Step 904, the base station selects an E-RNTI according to current control demand, and transmits an absolute grant which is identified as the selected E-RNTI to the UE through the first channel.

In this embodiment, the absolute grant includes an activation indication or a deactivation indication of a HARQ process of the UE, the activation indication of a HARQ process of the UE is a specific grant value.

Further, after step 904, the base station transmits process state information of the UE to the RNC, in this case, after receiving the process state information of the UE, the RNC may configure or may not configure the process state of the UE.

Besides, in this embodiment, in step 902, after the base station transmits the E-RNTI configured by the base station for the UE and the HARQ process information allocated by the base station for the UE to the RNC via the second message, the base station may further transmits the process state information of the UE to the RNC, then the RNC initially configures or reconfigures the process state information of the UE according to the process state information of the UE. Specifically, the RNC may perform initial configuration or reconfiguration for the process state information of one LIE according to the process state information of this UE; or, the RNC may perform initial configuration or reconfiguration for the process state information of at least two UEs according to the process state information of the at least two UEs, at this time, the RNC may control all the UEs belonging to one group, and thus the operation of activating or deactivating the process of the group can be achieved, thereby reducing the utilization of E-AGCHs, improving the utilization efficiency of downlink code resources, and preventing the downlink throughput from being limited.

Where, the process state information of the UE may be HARQ activation or deactivation state information of the UE, load information of a HARQ process, high low rate indication information and indicating grant information or a combination thereof.

The aforementioned embodiment can achieve that the RNC configures the process state of the UE according to the process state information of the UE, thus all the UEs belonging to one group can be controlled, and then the operation of activating or deactivating the process of the group can be achieved, thereby reducing the utilization of E-AGCHs, improving the utilization efficiency of downlink code resources, and preventing the downlink throughput from being limited.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as ROM, RAM, magnetic disk, or optical disk.

Figure 10:
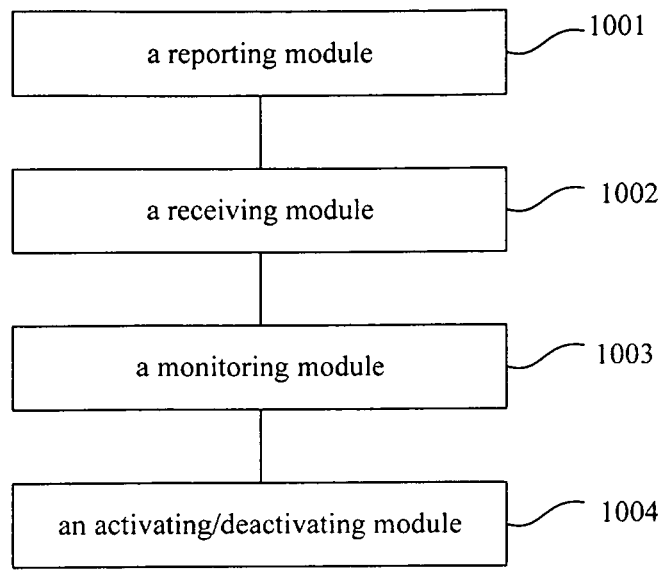
FIG. 10 is a schematic structural diagram of a user equipment according to an embodiment of the present invention.

FIG. 10 is a schematic structural diagram of a user equipment according to an embodiment of the present invention, the UE in this embodiment can achieve the procedure of the embodiment shown in FIG. 1, as shown in FIG. 10, the UE may include: a reporting module 1001, a receiving module 1002, a monitoring module 1003 and an activating/deactivating module 1004;

Where, the reporting module 1001 is configured to report to an RNC a capability of the UE to support an uplink enhanced dedicated channel;

the receiving module 1002 is configured to receive a configuration message transmitted by the RNC, where the configuration message carries an E-RNTI; the E-RNTI carried in the configuration message includes an E-RNTI allocated to a group to which the UE belongs;

the monitoring module 1003 is configured to monitor a first channel by using the E-RNTI carried in the configuration message which is received by the receiving module 1002;

the activating/deactivating module 1004 is configured to activate or deactivate an HARQ process according to an absolute grant received by the monitoring module 1003 in the first channel.

In this embodiment, the first channel may be an E-AGCH, a common E-AGCH or a non-serving E-AGCH.

In this embodiment, the absolute grant includes an activation indication or a deactivation indication of a HARQ process of the UE, the activation indication of a HARQ process of the UE is a specific grant value.

In the aforementioned embodiment, the reporting module 1001 reports to an RNC a capability of the UE to support an uplink enhanced dedicated channel; the receiving module 1002 receives a configuration message transmitted by the RNC, then the monitoring module 1003 monitors a first channel by using the E-RNTI carried in the configuration message which is received by the receiving module 1002, where the E-RNTI carried in the configuration message may include an E-RNTI allocated to a group to which the UE belongs; the activating/deactivating module 1004 activates or deactivates a HARQ process according to an absolute grant received by the monitoring module 1003 in the first channel. Therefore, it can be achieved that all the UEs belonging to one group can be controlled according to the E-RNTI which is allocated to the group to which the aforementioned UE belongs and is carried in the configuration message, and thus the operation of activating or deactivating the process of the group can be achieved, thereby reducing the utilization of E-AGCHs, improving the utilization efficiency of downlink code resources, and preventing the downlink throughput from being limited.

Figure 11:
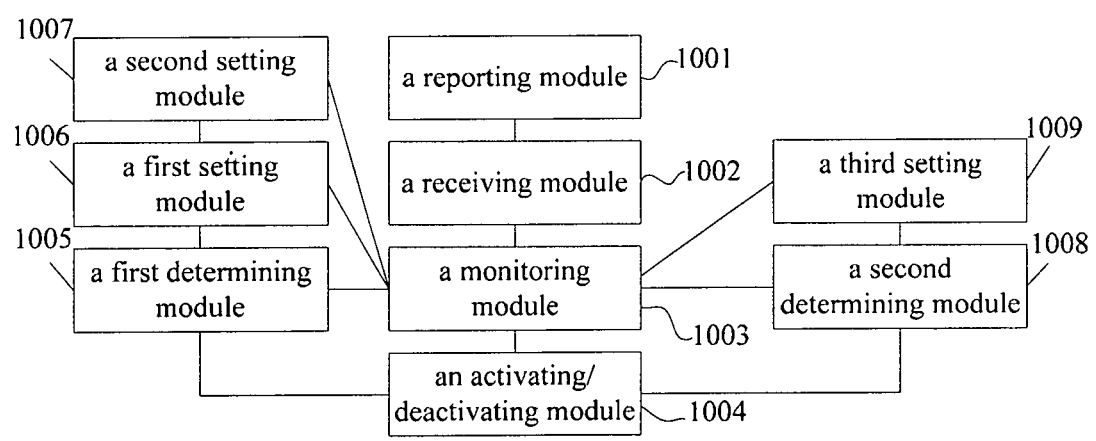
FIG. 11 is a schematic structural diagram of a user equipment according to another embodiment of the present invention.

FIG. 11 is a schematic structural diagram of a user equipment according to another embodiment of the present invention, comparing with the UE in FIG. 10, the differences lie in: in an implementation of the embodiment, the E-RNTI carried in the configuration message which is received by the receiving module 1002 includes a first E-RNTI and a primary E-RNTI; or, the E-RNTI carried in the configuration message which is received by the receiving module 1002 includes a first E-RNTI, a primary E-RNTI and a secondary E-RNTI; in this implementation, the E-RNTI allocated to the group to which the UE belongs is the first E-RNTI, where the first E-RNTI may be an additional primary E-RNTI, and may also be a group E-RNTI; in this implementation, the first E-RNTI is common, the base station configures a uniform first E-RNTI for all UEs in the group to which the UE belongs. In this way, all the UEs belonging to one group can be controlled according to the first E-RNTI, and thus the operation of activating or deactivating the process of the group can be achieved, thereby reducing the utilization of E-AGCHs, improving the utilization efficiency of downlink code resources, and preventing the downlink throughput from being limited.

In this implementation, the UE may further includes: a first determining module 1005;

the first determining module 1005 is configured to, before the activating/deactivating module 1004 activates or deactivates a HARQ process, determine a type of an absolute grant which is identified as a first E-RNTI or a primary E-RNTI to be a primary grant when the monitoring module 1003 receives the absolute grant which is identified as the first E-RNTI or the primary E-RNTI in the first channel.

In a specific implementation of this implementation, the activating/deactivating module 1004 is specifically configured to, when an identification of the absolute grant received by the monitoring module 1003 in the first channel is a first E-RNTI, and an absolute grant value of the absolute grant is a deactivation command, deactivate a HARQ process corresponding to a HARQ process number which is corresponding to a current TTI if an absolute grant scope of the absolute grant is per HARQ process and a 2 milliseconds TTI is configured; or, deactivate all HARQ processes if an absolute grant scope of the absolute grant is all HARQ processes and a 2 milliseconds TTI is configured but a secondary E-RNTI is not configured; or, activate all HARQ processes if the absolute grant scope of the absolute grant is all HARQ processes and a secondary E-RNTI is configured, and set a service grant as storing a second grant value, and set a validity of a primary grant to be false.

In another specific implementation of this implementation, the activating/deactivating module 1004 is specifically configured to, when an identification of the absolute grant received by the monitoring module 1003 in the first channel is a first E-RNTI, and an absolute grant value of the absolute grant is not a deactivation command, activate a HARQ process corresponding to a HARQ process number which is corresponding to a current TTI if an absolute grant scope of the absolute grant is per HARQ process; or, activate all HARQ processes if the absolute grant scope of the absolute grant is all HARQ processes.

In still another specific implementation of this implementation, the activating/deactivating module 1004 is specifically configured to, when an identification of the absolute grant received by the monitoring module 1003 in the first channel is a first E-RNTI, and an absolute grant value of the absolute grant is not a deactivation command, activate a HARQ process corresponding to a HARQ process number which is corresponding to a current TTI, and deactivate all HARQ processes except the HARQ process corresponding to the HARQ process number which is corresponding to the current TTI.

In this implementation, the UE may further includes: a first setting module 1006;

where, the first setting module 1006 is configured to, when an identification of the absolute grant received by the monitoring module 1003 in the first channel is a first E-RNTI, and an absolute grant value of the absolute grant is not a deactivation command, set a validity of a primary grant to be true; or, the first setting module 1006 is configured to, when an identification of the absolute grant received by the monitoring module 1003 in the first channel is a first E-RNTI, and an absolute grant value of the absolute grant is not a deactivation command, start a timer if the timer of the absolute grant is in an untriggered state, or, reset a timer if the timer of the absolute grant is in a triggered state; or, the first setting module 1006 is configured to, when an identification of the absolute grant received by the monitoring module 1003 in the first channel is a first E-RNTI, a primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

In this implementation, the reporting module 1001 is specifically configured to report to the RNC a capability of the UE to support receiving an absolute grant which is identified as a first E-RNTI during an uplink enhanced dedicated channel operation.

In another implementation of this embodiment, the E-RNTI carried in the configuration message which is received by the receiving module 1002 includes a primary E-RNTI and a secondary E-RNTI; in this implementation, the E-RNTI allocated to the group to which the UE belongs is the secondary E-RNTI, where the secondary E-RNTI is common, the base station configures a uniform secondary E-RNTI for all UEs in the group to which the UE belongs. In this way, all the UEs belonging to one group can be controlled according to the secondary E-RNTI, and thus the operation of activating or deactivating the process of the group can be achieved, thereby reducing the utilization of E-AGCHs, improving the utilization efficiency of downlink code resources, and preventing the downlink throughput from being limited.

In a specific implementation of this implementation, the activating/deactivating module 1004 is specifically configured to, when an identification of the absolute grant received by the monitoring module 1003 in the first channel is a secondary E-RNTI, and an absolute grant value of the absolute grant is a deactivation command, deactivate a HARQ process corresponding to a HARQ process number which is corresponding to a current TTI if an absolute grant scope of the absolute grant is per HARQ process and a 2 milliseconds TTI is configured; or, deactivate all HARQ processes if the absolute grant scope of the absolute grant is all HARQ processes and a 2 milliseconds TTI is configured.

In another specific implementation of this implementation, the activating/deactivating module 1004 is specifically configured to, when an identification of the absolute grant received by the monitoring module 1003 in the first channel is a secondary E-RNTI, and an absolute grant value of the absolute grant is not a deactivation command, activate a HARQ process corresponding to a HARQ process number which is corresponding to a current TTI if an absolute grant scope of the absolute grant is per HARQ process; or, activate all HARQ processes if the absolute grant scope of the absolute grant is all HARQ processes.

In still another specific implementation of this implementation, the activating/deactivating module 1004 is specifically configured to, when an identification of the absolute grant received by the monitoring module 1003 in the first channel is a secondary E-RNTI, and an absolute grant value of the absolute grant is not a deactivation command, activate a HARQ process corresponding to a HARQ process number which is corresponding to a current TTI, and deactivate all HARQ processes except the HARQ process corresponding to the HARQ process number which is corresponding to the current TTI.

In this implementation, the UE may further includes: a second setting module 1007;

the second setting module 1007 is configured to, when an identification of the absolute grant received by the monitoring module 1003 in the first channel is a secondary E-RNTI, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command; or, the second setting module 1007 is configured to, when an identification of the absolute grant received by the monitoring module 1003 in the first channel, is a secondary E-RNTI, and an absolute grant value of the absolute grant is not a deactivation command, start a timer if the timer of the absolute grant is in an untriggered state; or, reset a timer if the timer of the absolute grant is in a triggered state.

In still another implementation of this embodiment, the E-RNTI carried in the configuration message which is received by the receiving module 1002 includes a primary E-RNTI; or, the E-RNTI carried in the configuration message which is received by the receiving module 1002 includes a primary E-RNTI and a secondary E-RNTI;

In this implementation, the UE may further includes: a second determining module 1008;

the second determining module 1008 is configured to, before the activating/deactivating module 1004 activates or deactivates a HARQ process, determine a type of an absolute grant which is identified as a primary E-RNTI to be a primary grant when the monitoring module 1003 receives the absolute grant which is identified as the primary E-RNTI in the first channel.

In a specific implementation of this implementation, the activating/deactivating module 1004 is specifically configured to, when an identification of the absolute grant received by the monitoring module 1003 in the first channel is the primary E-RNTI: and an absolute grant value of the absolute grant is a deactivation command, deactivate a HARQ process corresponding to a HARQ process number which is corresponding to a current TTI if an absolute grant scope of the absolute grant is per HARQ process and a 2 milliseconds TTI is configured; or, deactivate all HARQ processes if the absolute grant scope of the absolute grant is all HARQ processes and a 2 milliseconds TTI is configured but a secondary E-RNTI is not configured; or, activate all HARQ processes if the absolute grant scope of the absolute grant is all HARQ processes and a secondary E-RNTI is configured, set a service grant as storing a second grant value, and set a validity of a primary grant to be false.

In another specific implementation of this implementation, the activating/deactivating module 1004 is specifically configured to, when an identification of the absolute grant received by the monitoring module 1003 in the first channel is the primary E-RNTI, and an absolute grant value of the absolute grant is not a deactivation command, activate a HARQ process corresponding to a HARQ process number which is corresponding to a current TTI if an absolute grant scope of the absolute grant is per HARQ process; or, activate all HARQ processes if the absolute grant scope of the absolute grant is all HARQ processes.

In this implementation, the UE may further includes: a third setting module 1009;

the third setting module 1009 is configured to, when an identification of the absolute grant received by the monitoring module 1003 in the first channel is the primary E-RNTI, and an absolute grant value of the absolute grant is not a deactivation command, set a validity of a primary grant to be true; or, the third setting module 1009 is configured to, when an identification of the absolute grant received by the monitoring module 1003 in the first channel is the primary E-RNTI, and an absolute grant value of the absolute grant is not a deactivation command, start a timer if the timer of the absolute grant is in an untriggered state, or, reset a timer if the timer of the absolute grant is in a triggered state; or, the third setting module 1009 is configured to, when an identification of the absolute grant received by the monitoring module 1003 in the first channel is the primary E-RNTI or a validity of the primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

This embodiment can achieve that all the UEs belonging to one group can be controlled according to the E-RNTI which is allocated to the group to which the UE belongs and is carried in the configuration message, and then the operation of activating or deactivating the process of the group can be achieved, thereby reducing the utilization of E-AGCHs, improving the utilization efficiency of downlink code resources, and preventing the downlink throughput from being limited.

Figure 12:
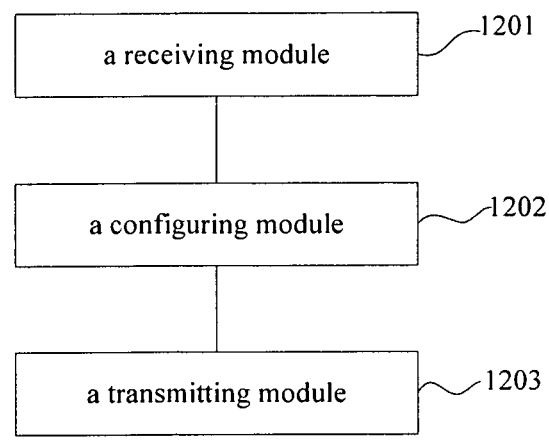
FIG. 12 is a schematic structural diagram of a base station according to an embodiment of the present invention.

FIG. 12 is a schematic structural diagram of a base station according to an embodiment of the present invention, the base station in this embodiment can achieve the procedure of the embodiment shown in FIG. 2, as shown in FIG. 12, the base station may include: a receiving module 1201, a configuring module 1202 and a transmitting module 1203;

where, the receiving module 1201 is configured to receive uplink enhanced dedicated channel configuration information of a UE transmitted by an RNC;

the configuring module 1202 is configured to configure an E-RNTI for the UE after the receiving module 1201 receives the uplink enhanced dedicated channel configuration information of the UE transmitted by the RNC; where, the E-RNTI configured by the configuring module 1202 for the UE includes an E-RNTI allocated by the configuring module 1202 to a group to which the UE belongs;

the transmitting module 1203 is configured to transmit the E-RNTI configured by the configuring module 1202 for the UE to the RNC, and transmit an absolute grant which is identified as the configured E-RNTI to the UE through a first channel.

In this embodiment, the first channel may be an E-AGCH, a common E-AGCH or a non-serving E-AGCH.

In an implementation of this embodiment, the configuring module 1202 is specifically configured to configure a first E-RNTI and a primary E-RNTI for the UE; or, configure a first E-RNTI, a primary E-RNTI and a secondary E-RNTI for the UE; in this implementation, the E-RNTI allocated by the configuring module 1202 to the group to which the UE belongs is the first E-RNTI, where the first E-RNTI may be an additional primary E-RNTI, and may also be a group E-RNTI. In this implementation, the first E-RNTI is common, the configuring module 1202 configures a uniform first E-RNTI for all UEs in the group to which the LIE belongs. In this way, all the UEs belonging to one group can be controlled according to the first E-RNTI, and then the operation of activating or deactivating the process of the group can be achieved, thereby reducing the utilization of E-AGCHs, improving the utilization efficiency of downlink code resources, and preventing the downlink throughput from being limited.

In this implementation, where the transmitting module 1203 is configured to transmit the absolute grant which is identified as the configured E-RNTI to the UE through the first channel may be: the transmitting module 1203 is specifically configured to transmit an absolute grant which is identified as the primary E-RNTI to the UE through the first channel when current control demand is single control; or, transmit an absolute grant which is identified as the first E-RNTI to the UE through the first channel when current control demand is group control.

Further, the transmitting module 1203 is further configured to, after transmitting the absolute grant which is identified as the configured E-RNTI to the UE through the first channel, when the base station needs to change the first E-RNTI of the UE, transmit the updated first E-RNTI to the RNC, and notify the RNC to perform an alternation of the first E-RNTI, so as to enable the RNC to transmit the updated first E-RNTI to the UE.

In another implementation of this embodiment, the configuring module 1202 is specifically configured to configure a first E-RNTI and a primary E-RNTI for the UE. In this implementation, the E-RNTI allocated by the configuring module 1202 to the group to which the UE belongs is the secondary E-RNTI, where the secondary E-RNTI is common, the configuring module 1202 configures a uniform secondary E-RNTI for all UEs in the group to which the UE belongs. In this way, all the UEs belonging to one group can be controlled according to the Secondary E-RNTI, and then the operation of activating or deactivating the process of the group can be achieved, thereby reducing the utilization of E-AGCHs, improving the utilization efficiency of downlink code resources, and preventing the downlink throughput from being limited.

In this implementation, where the transmitting module 1203 is configured to transmit the absolute grant which is identified as the configured E-RNTI to the UE through the first channel may be: the transmitting module 1203 is specifically configured to transmit an absolute grant which is identified as the primary E-RNTI to the UE through the first channel when current control demand is single control; or, transmit an absolute grant which is identified as the secondary E-RNTI to the UE through the first channel when current control demand is group control.

Further, the transmitting module 1203 is further configured to, after transmitting the absolute grant which is identified as the configured E-RNTI to the UE through the first channel, when the base station needs to change a secondary E-RNTI of the UE, transmit an updated secondary E-RNTI to the RNC, and notify the RNC to perform an alternation of the secondary E-RNTI, so as to enable the RNC to transmit the updated secondary E-RNTI to the UE.

In still another implementation of this embodiment, the configuring module 1202 is specifically configured to configure a primary E-RNTI for the UE; or, configure a primary E-RNTI and a secondary E-RNTI for the UE.

Further, the transmitting module 1203 is further configured to transmit HARQ process information allocated by the configuring module 1202 for the UE to the RNC, after the configuring module 1202 configures an E-RNTI for the UE. Where, the HARQ process information may be HARQ process configuration information which permits the UE to transmit data.

Further, the transmitting module 1203 is further configured to transmit process state information of the UE to the RNC after transmitting the HARQ process information allocated by the configuring module 1202 for the UE to the RNC, so as to enable the RNC to initially configure or reconfigure process state of the UE according to the process state information.

Further, the transmitting module 1203 is further configured to transmit the process state information of the UE to the RNC after transmitting the absolute grant which is identified as the configured E-RNTI to the UE through the first channel, in this case, after receiving the process state information of the UE, the RNC may configure or may not configure the process state of the UE.

Where, the process state information of the UE may be HARQ activation or deactivation state information of the UE, load information of a HARQ process, high low rate indication information and indicating grant information or a combination thereof.

In this embodiment, the receiving module 1201 is further configured to receive an indication message transmitted by the RNC after receiving uplink enhanced dedicated channel configuration information of the UE transmitted by the RNC and before the configuring module 1202 configures an E-RNTI for the UE, where the indication message is used for indicating the base station to perform a message configuration for radio link establishment. That is to say, the base station may configure the E-RNTI for the UE after receiving the indication message transmitted by the RNC.

In this embodiment, the configuring module 1202 is specifically configured to configure an E-RNTI for the UE according to current control reference information; where the current control reference information includes any one or a combination of: a rate of the UE, a data block of the UE, a process number allocated to the UE, group information corresponding to the UE and current process usage situation of a cell.

In this embodiment, after the receiving module 1201 receives uplink enhanced dedicated channel configuration information of the UE transmitted by the RNC, the configuring module 1202 configures an E-RNTI for the UE; then the transmitting module 1203 transmits the E-RNTI configured by the configuring module 1202 for the UE to the RNC, and the RNC transmits the E-RNTI configured by the base station for the UE to the UE, where, the E-RNTI configured by the base station for the UE may include an E-RNTI allocated by the base station to a group to which the UE belongs; therefore, it can be achieved that all the UEs belonging to one group are controlled according to the E-RNTI allocated by the base station to a group to which the UE belongs, and then the operation of activating or deactivating the process of the group can be achieved, thereby reducing the utilization of E-AGCHs, improving the utilization efficiency of downlink code resources, and preventing the downlink throughput from being limited.

FIG. 13 is a schematic structural diagram of a radio network controller according to an embodiment of the present invention, the RNC in this embodiment can achieve the procedure of the embodiment shown in FIG. 3, as shown in FIG. 13, the RNC may include: a receiving module 1301 and a transmitting module 1302;

where, the receiving module 1301 is configured to receive a capability of a UE to support an uplink enhanced dedicated channel reported by the UE; and receive an E-RNTI configured by a base station for the UE transmitted by the base station after the transmitting module 1302 transmits uplink enhanced dedicated channel configuration information of the UE to the base station; where the E-RNTI configured by the base station for the UE includes an E-RNTI allocated by the base station to a group to which the UE belongs;

the transmitting module 1302 is configured to transmit the uplink enhanced dedicated channel configuration information of the UE to the base station; and transmit the E-RNTI configured by the base station for the UE to the UE after the receiving module 1301 receives the E-RNTI configured by the base station for the UE transmitted by the base station, so as to enable the UE to monitor a first channel by using the configured E-RNTI, and activate or deactivate an HARQ process according to an absolute grant received in the first channel.

In this embodiment, after the receiving module 1301 receives the capability of the UE to support an uplink enhanced dedicated channel reported by the UE, the transmitting module 1302 transmits uplink enhanced dedicated channel configuration information of the UE to a base station. Where, the uplink enhanced dedicated channel configuration information of the UE includes information such as a frame offset of an uplink enhanced dedicated channel supported by the UE.

In this embodiment, the first channel may be an E-AGCH, a common E-AGCH or a non-serving E-AGCH.

In an implementation of this embodiment, the E-RNTI which is configured by the base station for the UE and is received by the receiving module 1301 includes a first E-RNTI and a primary E-RNTI; or, the E-RNTI which is configured by the base station for the UE and is received by the receiving module 1301 includes a first E-RNTI, a primary E-RNTI and a secondary E-RNTI. In this implementation, the E-RNTI allocated by the base station to a group to which the UE belongs is the first E-RNTI, where the first E-RNTI may be an additional primary E-RNTI, and may also be a group E-RNTI. In this implementation, the first E-RNTI is common, the base station configures a uniform first E-RNTI for all UEs in the group to which the UE belongs. In this way, all the UEs belonging to one group can be controlled according to the first E-RNTI, and then the operation of activating or deactivating the process of the group can be achieved, thereby reducing the utilization of E-AGCHs, improving the utilization efficiency of downlink code resources, and preventing the downlink throughput from being limited.

Further, the receiving module 1301 is further configured to, after the transmitting module 1302 transmits the E-RNTI configured by the base station for the UE to the UE, receive an updated first E-RNTI transmitted by the base station, and receive a notification for performing an alternation of the first E-RNTI transmitted by the base station;

the transmitting module 1302 is further configured to transmit the updated first E-RNTI received by the receiving module 1301 to the UE.

In another implementation of this embodiment, the E-RNTI which is configured by the base station for the UE and is received by the receiving module 1301 includes a primary E-RNTI and a secondary E-RNTI. In this implementation, the E-RNTI allocated by the base station to a group to which the UE belongs is the secondary E-RNTI; where the secondary E-RNTI is common, the base station configures a uniform secondary E-RNTI for all UEs in the group to which the UE belongs. In this way, all the UEs belonging to one group can be controlled according to the secondary E-RNTI, and then the operation of activating or deactivating the process of the group can be achieved, thereby reducing the utilization of E-AGCHs, improving the utilization efficiency of downlink code resources, and preventing the downlink throughput from being limited.

Further, the receiving module 1301 is further configured to, after the transmitting module 1302 transmits the E-RNTI configured by the base station for the UE to the UE, receive an updated secondary E-RNTI transmitted by the base station, and receive a notification for performing an alternation of the secondary E-RNTI transmitted by the base station;

the transmitting module 1302 is further configured to transmit the updated secondary E-RNTI received by the receiving module 1301 to the UE.

In still another implementation of this embodiment, the E-RNTI which is configured by the base station for the UE and is received by the receiving module 1301 includes a primary E-RNTI; or, the E-RNTI which is configured by the base station for the UE and is received by the receiving module 1301 includes a primary E-RNTI and a secondary E-RNTI.

Further, the receiving module 1301 is further configured to, after the transmitting module 1302 transmits the uplink enhanced dedicated channel configuration information of the UE to the base station, receive HARQ process information allocated by the base station to the UE. Where, the HARQ process information may be, HARQ process configuration information which permits the UE to transmit data.

Optionally, the RNC may further include: a configuring module 1303;

the receiving module 1301 is further configured to receive process state information allocated by the base station for the UE after receiving the HARQ process information allocated by the base station for the UE;

the configuring module 1303 is further configured to initially configure or reconfigure process state of the UE according to the process state information received by the receiving module 1301.

In this embodiment, the receiving module 1301 is further configured to receive the process state information of the UE transmitted by the base station after the transmitting module 1302 transmits the E-RNTI configured by the base station for the UE to the UE, in this case, after receiving the process state information of the UE, the RNC may configure or may not configure the process state of the UE.

Where, the process state information of the UE may be HARQ activation or deactivation state information of the UE, load information of a HARQ process, high low rate indication information and indicating grant information or a combination thereof.

The transmitting module 1302 is further configured to, after transmitting the uplink enhanced dedicated channel configuration information of the UE to the base station, and before the receiving module 1301 receives the E-RNTI configured by the base station for the UE transmitted by the base station, transmit an indication message to the base station, where the indication message is used for indicating the base station to perform a message configuration for radio link establishment. That is to say, the base station may configure the E-RNTI for the UE after receiving the indication message transmitted by the RNC.

In this embodiment, after the receiving module 1301 receives a capability of a UE to support an uplink enhanced dedicated channel reported by the UE, the transmitting module 1302 transmits the uplink enhanced dedicated channel configuration information of the UE to a base station, then the receiving module 1301 receives an E-RNTI configured by the base station for the UE transmitted by the base station, and the transmitting module 1302 transmits the E-RNTI configured by the base station for the UE to the UE, where, the E-RNTI configured by the base station for the UE may include an E-RNTI allocated by the base station to a group to which the UE belongs, therefore, it can be achieved that all the UEs belonging to one group re controlled according to the E-RNTI allocated to a group to which the UE belongs, and then the operation of activating or deactivating the process of the group can be achieved, thereby reducing the utilization of E-AGCHs, improving the utilization efficiency of downlink code resources, and preventing the downlink throughput from being limited.

Figure 14:
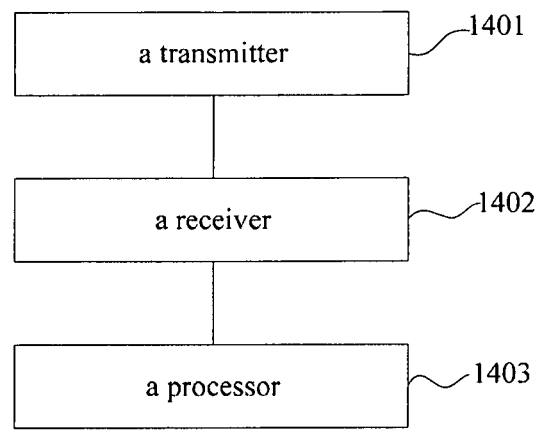
FIG. 14 is a schematic structural diagram of a user equipment according to still another embodiment of the present invention.

FIG. 14 is a schematic structural diagram of a user equipment according to still another embodiment of the present invention, the UE in this embodiment can achieve the procedure of the embodiment shown in FIG. 1, as shown in FIG. 14, the UE may include: a transmitter 1401, a receiver 1402 and a processor 1403;

where, the transmitter 1401 is configured to report to an RNC a capability of the UE to support an uplink enhanced dedicated channel;

the receiver 1402 is configured to receive a configuration message transmitted by the RNC, where the configuration message carries an E-RNTI; the E-RNTI carried in the configuration message includes an E-RNTI allocated to a group to which the UE belongs;

the processor 1403 is configured to monitor a first channel by using the E-RNTI carried in the configuration message which is received by the receiver 1402, and activate or deactivate an HARQ process according to an absolute grant received in the first channel.

In this embodiment, the first channel may be an E-AGCH, a common E-AGCH or a non-serving E-AGCH.

In this embodiment, the absolute grant includes an activation indication or a deactivation indication of a HARQ process of the UE, the activation indication of a HARQ process of the UE is a specific grant value.

In an implementation of this embodiment, the E-RNTI carried in the configuration message which is received by the receiver 1402 includes a first E-RNTI and a primary E-RNTI; or, the E-RNTI carried in the configuration message which is received by the receiver 1402 includes a first E-RNTI, a primary E-RNTI and a secondary E-RNTI. In this implementation, the E-RNTI allocated to a group to which the UE belongs is the first E-RNTI, the first E-RNTI may be an additional primary E-RNTI, and may also be a group E-RNTI; in this implementation, the first E-RNTI is common, the base station configures a uniform first E-RNTI for all UEs in the group to which the UE belongs. In this way, all the UEs belonging to one group can be controlled according to the first E-RNTI, and then the operation of activating or deactivating the process of the group can be achieved, thereby reducing the utilization of E-AGCHs, improving the utilization efficiency of downlink code resources, and preventing the downlink throughput from being limited.

In this implementation, the processor 1403 is further configured to, before activating or deactivating a HARQ process, when receiving an absolute grant which is identified as a first E-RNTI or a primary E-RNTI in the first channel, determine a type of the absolute grant which is identified as the first E-RNTI or the primary E-RNTI to be a primary grant.

In another specific implementation of this implementation, where the processor 1403 is configured to activate or deactivate the HARQ process according to the absolute grant received in the first channel includes:

the processor 1403 is specifically configured to, when the identification of the absolute grant received in the first channel is a first E-RNTI, and an absolute grant value of the absolute grant is a deactivation command, deactivate an HARQ process corresponding to an HARQ process number which is corresponding to a current TTI if an absolute grant scope of the absolute grant is per HARQ process and a 2 milliseconds TTI is configured; or, deactivate all the HARQ processes if the absolute grant scope of the absolute grant is all HARQ processes and a 2 milliseconds TTI is configured but a secondary E-RNTI is not configured; or, activate all the HARQ processes if the absolute grant scope of the absolute grant is all HARQ processes and a secondary E-RNTI is configured, and set a service grant as storing a second grant value, and set a validity of a primary grant to be false.

In another specific implementation of this implementation, where the processor 1403 is configured to activate or deactivate the HARQ process according to the absolute grant received in the first channel includes:

the processor 1403 is specifically configured to, when an identification of the absolute grant received in the first channel is a first E-RNTI, and an absolute grant value of the absolute grant is not a deactivation command, activate a HARQ process corresponding to a HARQ process number which is corresponding to a current TTI if an absolute grant scope of the absolute grant is per HARQ process; or, activate all the HARQ processes if the absolute grant scope of the absolute grant is all HARQ processes.

In another specific implementation of this implementation, where the processor 1403 is configured to activate or deactivate the HARQ process according to the absolute grant received in the first channel includes:

the processor 1403 is specifically configured to, when an identification of the absolute grant received in the first channel is a first E-RNTI, and an absolute grant value of the absolute grant is not a deactivation command, activate a HARQ process corresponding to a HARQ process number which is corresponding to a current TTI, and deactivate all HARQ processes except the HARQ process corresponding to the HARQ process number which is corresponding to the current TH.

In still another specific implementation of this implementation, the processor 1403 is further configured to, when an identification of the absolute grant received in the first channel is a first E-RNTI, and an absolute grant value of the absolute grant is not a deactivation command, set a validity of a primary grant to be true.

In still another specific implementation of this implementation, the processor 1403 is further configured to, when an identification of the absolute grant received in the first channel is a first E-RNTI, and an absolute grant value of the absolute grant is not a deactivation command, start a timer if the timer of the absolute grant is in an untriggered state, or, reset a timer if the timer of the absolute grant is in a triggered state.

In still another specific implementation of this implementation, the processor 1403 is further configured to, when an identification of the absolute grant received in the first channel is a first E-RNTI, a primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

In this implementation, the transmitter 1401 is specifically configured to report to the RNC a capability of the LIE to support receiving an absolute grant which is identified as a first E-RNTI during an uplink enhanced dedicated channel operation.

In still another implementation, the E-RNTI carried in the configuration message which is received by the receiver 1402 includes a primary. E-RNTI and a secondary E-RNTI; in this implementation, the E-RNTI allocated to a group to which the UE belongs is the secondary E-RNTI where the secondary E-RNTI is common, and the base station configures a uniform secondary E-RNTI for all UEs in the group to which the UE belongs. In this way, all the UEs belonging to one group can be controlled according to the secondary E-RNTI, and then the operation of activating or deactivating the process of the group can be achieved, thereby reducing the utilization of E-AGCHs, improving the utilization efficiency of downlink code resources, and preventing the downlink throughput from being limited.

In a specific implementation of this implementation, where the processor 1403 is configured to activate or deactivate the HARQ process according to the absolute grant received in the first channel includes: the processor 1403 is specifically configured to, when an identification of the absolute grant received in the first channel is a secondary E-RNTI, and an absolute grant value of the absolute grant is a deactivation command, deactivate an HARQ process corresponding to an HARQ process number which is corresponding to a current ITT if an absolute grant scope of the absolute grant is per HARQ process and a 2 milliseconds TTI is configured; or, deactivate all HARQ processes if the absolute grant scope of the absolute grant is all HARQ processes and a 2 milliseconds TTI is configured.

In a specific implementation of this implementation, where the processor 1403 is configured to activate or deactivate the HARQ process according to the absolute grant received in the first channel includes:

the processor 1403 is specifically configured to, when an identification of the absolute grant received in the first channel is a secondary E-RNTI, and an absolute grant value of the absolute grant is not a deactivation command, activate an HARQ process corresponding to an HARQ process number which is corresponding to a current TTI if an absolute grant scope of the absolute grant is per HARQ process; or, activate all HARQ processes if the absolute grant scope of the absolute grant is all HARQ processes.

In a specific implementation of this implementation, where the processor 1403 is configured to activate or deactivate the HARQ process according to the absolute grant received in the first channel includes:

the processor 1403 is specifically configured to, when an identification of the absolute grant received in the first channel is a secondary E-RNTI, and an absolute grant value of the absolute grant is not a deactivation command, activate an HARQ process corresponding to an HARQ process number which is corresponding to a current TTI, and deactivate all HARQ processes except the HARQ process corresponding to the HARQ process number which is corresponding to the current TTI.

Further, in still another specific implementation of this implementation, the processor 1403 is further configured to, when an identification of the absolute grant received in the first channel is a secondary E-RNTI, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

In still another specific implementation of this implementation, the processor 1403 is further configured to, when an identification of the absolute grant received in the first channel is a secondary E-RNTI, and an absolute grant value of the absolute grant is not a deactivation command, start a timer if the timer of the absolute grant is in an untriggered state; or, reset a timer if the timer of the absolute grant is in a triggered state.

In still another implementation of this embodiment, the E-RNTI carried in the configuration message which is received by the receiver 1402 includes a primary E-RNTI; or, the E-RNTI carried in the configuration message which is received by the receiver 1402 includes a primary E-RNTI and a secondary E-RNTI;

In this implementation, the processor 1403 is further configured to, before activating or deactivating a HARQ process, when receiving an absolute grant which is identified as a primary E-RNTI in the first channel, determine a type of the absolute grant which is identified as a primary E-RNTI to be a primary grant.

In another specific implementation of this implementation, where the processor 1403 is configured to activate or deactivate the HARQ process according to the absolute grant received in the first channel includes:

the processor 1403 is specifically configured to, when an identification of the absolute grant received in the first channel is a primary E-RNTI, and an absolute grant value of the absolute grant is a deactivation command, deactivate a HARQ process corresponding to a HARQ process number which is corresponding to a current TTI if an absolute grant scope of the absolute grant is per HARQ process and a 2 milliseconds TTI is configured; or, deactivate all HARQ processes if the absolute grant scope of the absolute grant is all HARQ processes and a 2 milliseconds TTI is configured but a secondary E-RNTI is not configured; or, activate all HARQ processes if the absolute grant scope of the absolute grant is all HARQ processes and a secondary E-RNTI is configured, set a service grant as storing a second grant value, and set a validity of a primary grant to be false.

In another specific implementation of this implementation, where the processor 1403 is configured to activate or deactivate the HARQ process according to the absolute grant received in the first channel includes:

the processor 1403 is specifically configured to, when an identification of the absolute grant received in the first channel is a primary E-RNTI, and an absolute grant value of the absolute grant is not a deactivation command, activate a HARQ process corresponding to a HARQ process number which is corresponding to a current TTI if an absolute grant scope of the absolute grant is per HARQ process; or, activate all HARQ processes if the absolute grant scope of the absolute grant is all HARQ processes.

Further, in still another specific implementation of this implementation, the processor 1403 is further configured to, when an identification of the absolute grant received in the first channel is a primary E-RNTI, and an absolute grant value of the absolute grant is not a deactivation command, set a validity of a primary grant to be true.

In still another specific implementation of this implementation, the processor 1403 is further configured to, when an identification of the absolute grant received in the first channel is a primary E-RNTI, and an absolute grant value of the absolute grant is not a deactivation command, start a timer if the timer of the absolute grant is in an untriggered state, or, reset a timer if the timer of the absolute grant is in a triggered state.

In still another specific implementation of this implementation, the processor 1403 is further configured to, when an identification of the absolute grant received in the first channel is a primary E-RNTI or a validity of a primary grant is set to be false, and an absolute grant value of the absolute grant is not a deactivation command, set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

In the aforementioned embodiment, the transmitter 1401 reports to an RNC a capability of the UE to support an uplink enhanced dedicated channel; the receiver 1402 receives a configuration message transmitted by the RNC, then the processor 1403 monitors a first channel by using the E-RNTI carried in the configuration message which is received by the receiver 1402, where the E-RNTI carried in the configuration message may include an E-RNTI allocated to a group to which the UE belongs; then the processor 1403 activates or deactivates an HARQ process according to an absolute grant received in the first channel. Therefore, it can be achieved that all the UEs belonging to one group are controlled according to the E-RNTI which is allocated to the group to which the aforementioned UE belongs and is carried in the configuration message, and then the operation of activating or deactivating the process of the group can be achieved, thereby reducing the utilization of E-AGCHs, improving the utilization efficiency of downlink code resources, and preventing the downlink throughput from being limited.

Figure 15:
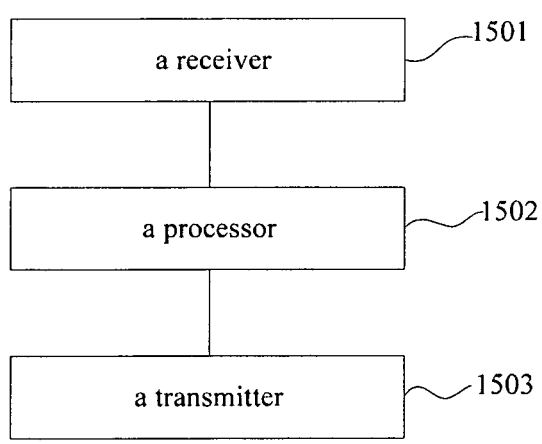
FIG. 15 is a schematic structural diagram of a base station according to another embodiment of the present invention.

FIG. 15 is another schematic structural diagram of a base station according to another embodiment of the present invention; the base station in this embodiment can achieve the procedure of the embodiment shown in FIG. 2, as shown in FIG. 15, the base station may include: a receiver 1501, a processor 1502 and a transmitter 1503;

where, the receiver 1501 is configured to receive uplink enhanced dedicated channel configuration information of a UE transmitted by an RNC;

the processor 1502 is configured to configure an E-RNTI for the UE after the receiver 1501 receives the uplink enhanced dedicated channel configuration information of the UE transmitted by the RNC; where the E-RNTI configured by the processor 1502 for the UE includes an E-RNTI allocated by the processor 1502 to a group to which the UE belongs;

the transmitter 1503 is configured to transmit the E-RNTI configured by the processor 1502 for the UE to the RNC, and transmit an absolute grant which is identified as the configured E-RNTI to the UE through a first channel.

In this embodiment, the first channel may be an E-AGCH, a common E-AGCH or a non-serving E-AGCH.

In an implementation of this embodiment, the processor 1502 is specifically configured to configure a first E-RNTI and a primary E-RNTI for the UE; or, configure a first E-RNTI, a primary E-RNTI and a secondary E-RNTI for the UE; in this implementation, the E-RNTI allocated by the processor 1502 to a group to which the UE belongs is the first E-RNTI, where the first E-RNTI may be an additional primary E-RNTI, and may also be a group E-RNTI. In this implementation, the first E-RNTI is common, the processor 1502 configures a uniform first E-RNTI for all UEs in the group to which the UE belongs. In this way, all the UEs belonging to one group can be controlled according to the first E-RNTI, and then the operation of activating or deactivating the process of the group can be achieved, thereby reducing the utilization of E-AGCHs, improving the utilization efficiency of downlink code resources, and preventing the downlink throughput from being limited.

In this implementation, where the transmitter 1503 is configured to transmit the absolute grant which is identified as the configured E-RNTI to the UE through the first channel includes: the transmitter 1503 is specifically configured to transmit an absolute grant which is identified as the primary E-RNTI to the UE through the first channel when current control demand is single control; or, transmit an absolute grant which is identified as the first E-RNTI to the UE through the first channel when the current control demand is group control.

Further, the transmitter 1503 is further configured to, after transmitting the absolute grant which is identified as the configured E-RNTI to the UE through the first channel, when the base station needs to change the first E-RNTI of the UE, transmit the updated first E-RNTI to the RNC, and notify the RNC to perform an alternation of the first E-RNTI, so as to enable the RNC to transmit the updated first E-RNTI to the UE.

In another implementation of this embodiment, the processor 1502 is specifically configured to configure a first E-RNTI and a primary E-RNTI for the UE. In this implementation, the E-RNTI allocated by the processor 1502 to the group to which the UE belongs is the secondary E-RNTI, where the secondary E-RNTI is common, the processor 1502 configures a uniform secondary E-RNTI for all UEs in the group to which the UE belongs. In this way, all the UEs belonging to one group can be controlled according to the Secondary E-RNTI, and then the operation of activating or deactivating the process of the group can be achieved, thereby reducing the utilization of E-AGCHs, improving the utilization efficiency of downlink code resources, and preventing the downlink throughput from being limited.

In this implementation, where the transmitter 1503 is configured to transmit the absolute grant which is identified as the configured E-RNTI to the UE through the first channel includes: the transmitter 1503 is specifically configured to transmit an absolute grant which is identified as the primary E-RNTI to the UE through the first channel when current control demand is single control; or, transmit an absolute grant which is identified as the secondary E-RNTI to the UE through the first channel when the current control demand is group control.

Further, the transmitter 1503 is further configured to, after transmitting an absolute grant which is identified as the configured E-RNTI to the UE through the first channel, when the base station needs to change a secondary E-RNTI of the UE, transmit the updated secondary E-RNTI to the RNC, and notify the RNC to perform an alternation of the secondary E-RNTI, so as to enable the RNC to transmit the updated secondary E-RNTI to the UE.

In still another implementation of this embodiment, the transmitter 1503 is specifically configured to configure a primary E-RNTI for the UE; or, configure a primary E-RNTI and a secondary E-RNTI for the UE.

Further, the transmitter 1503 is further configured to transmit HARQ process information allocated for the UE to the RNC after the processor 1502 configures an E-RNTI for the UE. Where, the HARQ process information may be HARQ process configuration information which permits the UE to transmit data.

Further, the transmitter 1503 is further configured to transmit process state information of the UE to the RNC after transmitting the HARQ process information allocated by the processor 1502 for the UE to the RNC, so as to enable the RNC to initially configure or reconfigure process state of the UE according to the process state information.

Further, the transmitter 1503 is further configured to transmit process state information of the UE to the RNC after transmitting the absolute grant which is identified as the configured E-RNTI to the UE through the first channel, in this case, after receiving the process state information of the UE, the RNC may configure or may not configure the process state of the UE.

Where, the process state information of the UE may be HARQ activation or deactivation state information of the UE, load information of a HARQ process, high low rate indication information and indicating grant information or a combination thereof.

In this embodiment, the receiver 1501 is further configured to receive an indication message transmitted by the RNC after receiving uplink enhanced dedicated channel configuration information of the UE transmitted by the RNC and before the processor 1502 configures an E-RNTI for the UE, where the indication message is used for indicating the base station to perform a message configuration for radio link establishment. That is to say, the base station configures the E-RNTI for the UE after receiving the indication message transmitted by the RNC.

In this embodiment, the receiver 1501 is specifically configured to configure an E-RNTI for the UE according to current control reference information; where the current control reference information includes any one or a combination of: a rate of the UE, a data block of the UE, a process number allocated to the UE, group information corresponding to the UE and current process usage situation of a cell.

In this embodiment, after the receiver 1501 receives uplink enhanced dedicated channel configuration information of a UE transmitted by an RNC, the processor 1502 configures an E-RNTI for the UE; then the transmitter 1503 transmits the E-RNTI configured for the UE to the RNC, and the RNC transmits the E-RNTI configured by the base station for the UE to the UE, where, the E-RNTI configured by the base station for the UE includes an E-RNTI allocated by the base station to a group to which the UE belongs. Therefore, it can be achieved that all the UEs belonging to one group are controlled according to the E-RNTI allocated by the base station to a group to which the UE belongs, and then the operation of activating or deactivating the process of the group can be achieved, thereby reducing the utilization of E-AGCHs, improving the utilization efficiency of downlink code resources, and preventing the downlink throughput from being limited.

Figure 16:
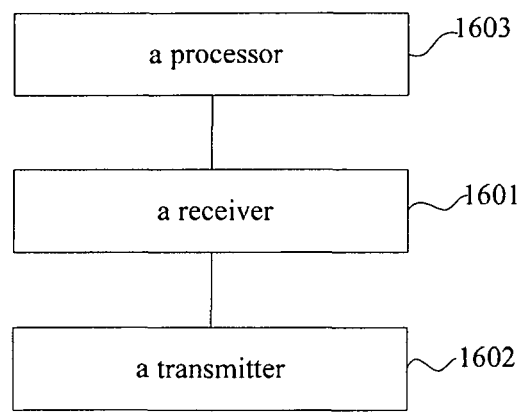
FIG. 16 is a schematic structural diagram of a radio network controller according to another embodiment of the present invention.

FIG. 16 is a schematic structural diagram of a radio network controller according to another embodiment of the present invention, the RNC in this embodiment can achieve the procedure of the embodiment shown in FIG. 3, as shown in FIG. 16, the RNC may include: a receiver 1601 and a transmitter 1602;

where, the receiver 1601 is configured to receive a capability of a UE to support an uplink enhanced dedicated channel reported by the UE; and receive an E-RNTI configured by a base station for the UE transmitted by the base station after the transmitter 1602 transmits uplink enhanced dedicated channel configuration information of the UE to the base station; where the E-RNTI configured by the base station for the UE includes an E-RNTI allocated by the base station to a group to which the UE belongs;

the transmitter 1602 is configured to transmit uplink enhanced dedicated channel configuration information of the UE to base station; and transmit the E-RNTI configured by the base station for the UE to the UE after the receiver 1601 receives the E-RNTI configured by the base station for the UE transmitted by the base station, so as to enable the UE to monitor a first channel by using the configured E-RNTI, and activate or deactivate an HARQ process according to an absolute grant received in the first channel.

In this embodiment, after the receiver 1601 receives a capability of a UE to support an uplink enhanced dedicated channel reported by the UE, the transmitter 1602 transmits uplink enhanced dedicated channel configuration information of the UE to a base station. Where, the uplink enhanced dedicated channel configuration information of the UE includes information such as a frame offset of an uplink enhanced dedicated channel supported by the UE.

In this embodiment, the first channel may be an E-AGCH, a common E-AGCH or a non-serving E-AGCH.

In an implementation of this embodiment, the E-RNTI which is configured by the base station for the UE and is received by the receiver 1601 includes a first E-RNTI and a primary E-RNTI; or, the E-RNTI which is configured by the base station for the UE and is received by the receiver 1601 includes a first E-RNTI, a primary E-RNTI and a secondary E-RNTI. In this implementation, the E-RNTI allocated to a group to which the UE belongs is the first E-RNTI, where the first E-RNTI may be an additional primary E-RNTI, or a group E-RNTI. In this implementation, the first E-RNTI is common, the base station configures a uniform first E-RNTI for all UEs in the group to which the UE belongs. In this way, all the UEs belonging to one group can be controlled according to the first E-RNTI, and then the operation of activating or deactivating the process of the group can be achieved, thereby reducing the utilization of E-AGCHs, improving the utilization efficiency of downlink code resources, and preventing the downlink throughput from being limited.

Further, the receiver 1601 is further configured to, after the transmitter 1602 transmits the E-RNTI configured by the base station for the UE to the UE, receive an updated first E-RNTI transmitted by the base station, and receive a notification for performing an alternation of the first E-RNTI transmitted by the base station;

the transmitter 1602 is further configured to transmit the updated first E-RNTI received by the receiver 1601 to the UE.

In an implementation of this embodiment, the E-RNTI which is configured by the base station for the UE and is received by the receiver 1601 includes a primary E-RNTI and a secondary E-RNTI. In this implementation, the E-RNTI allocated by the base station to a group to which the UE belongs is the secondary E-RNTI; where the secondary E-RNTI is common, the base station configures a uniform secondary E-RNTI for all UEs in the group to which the UE belongs. In this way, all the UEs belonging to one group can be controlled according to the secondary E-RNTI, and then the operation of activating or deactivating the process of the group can be achieved, thereby reducing the utilization of E-AGCHs, improving the utilization efficiency of downlink code resources, and preventing the downlink throughput from being limited.

Further, the receiver 1601 is further configured to, after the transmitter 1602 transmits the E-RNTI configured by the base station for the UE to the UE, receive an updated secondary E-RNTI transmitted by the base station, and receive a notification for performing an alternation of the Secondary E-RNTI transmitted by the base station;

The transmitter 1602 is further configured to transmit the updated secondary E-RNTI received by the receiver 1601 to the UE.

In still another implementation of this embodiment, the E-RNTI which is configured by the base station for the UE and is received by the receiver 1601 includes a primary E-RNTI; or, the E-RNTI which is configured by the base station for the UE and is received by the receiver 1601 includes a primary E-RNTI and a secondary E-RNTI.

Further, the receiver 1601 is further configured to receive HARQ process information allocated by the base station for the UE after the transmitter 1602 transmits uplink enhanced dedicated channel configuration information of the UE to the base station. Where, the HARQ process information may be HARQ process configuration information which permits the UE to transmit data.

Optionally, the RNC may further include: a processor 1603;

the receiver 1601 is further configured to receive process state information allocated by the base station for the UE after receiving the HARQ process information allocated by the base station for the UE;

the processor 1603 is further configured to initially configure or reconfigure process state information of the UE according to the process state information received by the receiver 1601.

In this embodiment, the receiver 1601 is further configured to receive process state information of the UE transmitted by the base station after the transmitter 1602 transmits the E-RNTI configured by the base station for the UE to the UE, in this case, after receiving the process state information of the UE, the RNC may configure or may not configure the process state of the UE.

Where, the process state information of the UE may be HARQ activation or deactivation state information of the UE, load information of a HARQ process, high low rate indication information and indicating grant information or a combination thereof.

The transmitter 1602 is further configured to, after transmitting the uplink enhanced dedicated channel configuration information of the UE to the base station, and before the receiver 1601 receives the E-RNTI configured by the base station for the UE transmitted by the base station, transmit an indication message to the base station, where the indication message is used for indicating the base station to perform a message configuration for radio link establishment. That is to say, the base station may configure the E-RNTI for the UE after receiving the indication message transmitted by the RNC.

In this embodiment, after the receiver 1601 receives a capability of a UE to support an uplink enhanced dedicated channel reported by the UE, the transmitter 1602 transmits uplink enhanced dedicated channel configuration information of the UE to a base station, then the receiver 1601 receives an E-RNTI configured by the base station for the UE transmitted by the base station, and the transmitter 1602 transmits the E-RNTI configured by the base station for the UE to the UE, where, the E-RNTI configured by the base station for the UE may include an E-RNTI allocated by the base station to a group to which the UE belongs, therefore, it can be achieved that all the UEs belonging to one group are controlled according to the E-RNTI allocated to the group to which the UE belongs, and then the operation of activating or deactivating the process of the group can be achieved, thereby reducing the utilization of E-AGCHs, improving the utilization efficiency of downlink code resources, and preventing the downlink throughput from being limited.

Persons of ordinary skill in the art may understand that the drawings are merely schematic figures of an preferable embodiment, modules or flows in the drawings may not be necessary for implementing the present invention.

Persons of ordinary skill in the art can understand that the implementation of modules in the apparatus of the embodiments can be distributed in the apparatus of the embodiment as described in the embodiments, and can also be distributed in one or more apparatus different from those in the embodiments with corresponding changes. The modules of the aforementioned embodiments may be combined into one module, or may be further split into multiple sub-modules.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the scope of the technical solutions of the embodiments of the present invention.

What is claimed is:

1. A method for group scheduling grant, comprising:
   reporting, by a user equipment to a radio network controller, a capability of the user equipment to support an uplink enhanced dedicated channel;
   receiving, by the user equipment, a configuration message transmitted by the radio network controller, wherein the configuration message carries an enhanced-radio network temporary identity (E-RNTI), wherein the E-RNTI comprises an E-RNTI allocated to a group to which the user equipment belongs, wherein the E-RNTI comprises a first E-RNTI and a primary E-RNTI and wherein the E-RNTI allocated to the group to which the user equipment belongs is the first E-RNTI; and monitoring, by the user equipment, a first channel by using the E-RNTI carried in the configuration message, and activating or deactivating a hybrid automatic repeat request (HARQ) process according to an absolute grant received by the user equipment in the first channel;

wherein the reporting, by the user equipment, to the radio network controller the capability of the user equipment to support the uplink enhanced dedicated channel comprises: reporting, by the user equipment, to the radio network controller a capability of the user equipment to support receiving an absolute grant that is identified as the first E-RNTI during an uplink enhanced dedicated channel operation.

2. The method according to claim 1, wherein before the activating or deactivating the HARQ process according to the absolute grant received by the user equipment in the first channel, further comprising:

when an absolute grant which is identified as the first E-RNTI or the primary E-RNTI is received by the user equipment in the first channel, determining, by the user equipment, a type of the absolute grant which is identified as the first E-RNTI or the primary E-RNTI to be a primary grant.

3. The method according to claim 1, wherein the activating or deactivating the hybrid automatic repeat request HARQ process according to the absolute grant received by the user equipment in the first channel comprises:

if an identification of the absolute grant received by the user equipment in the first channel is the first E-RNTI, and an absolute grant value of the absolute grant is a deactivation command, then:

deactivating, by the user equipment, a HARQ process corresponding to a HARQ process number which is corresponding to a current transmission time interval (TTI) when an absolute grant scope of the absolute grant is per HARQ process and a 2 milliseconds TTI is configured; or, deactivating, by the user equipment, all HARQ processes when an absolute grant scope of the absolute grant is all HARQ processes and a 2 milliseconds TTI is configured but a secondary E-RNTI is not configured; or, activating, by the user equipment, all HARQ processes when an absolute grant scope of the absolute grant is all HARQ processes and a secondary E-RNTI is configured, setting a service grant as storing a second grant value, and setting a validity of a primary grant to be false.

4. The method according to claim 1, wherein the activating or deactivating the hybrid automatic repeat request HARQ process according to the absolute grant received by the user equipment in the first channel comprises:

if an identification of the absolute grant received by the user equipment in the first channel is the first E-RNTI, and an absolute grant value of the absolute grant is not a deactivation command, then:

activating, by the user equipment, a HARQ process corresponding to a HARQ process number which is corresponding to a current transmission time interval (TTI) when an absolute grant scope of the absolute grant is per HARQ process; or, activating, by the user equipment, all HARQ processes when an absolute grant scope of the absolute grant is all HARQ processes.

5. The method according to claim 1, further comprising:

if an identification of the absolute grant received by the user equipment in the first channel is the first E-RNTI, the primary E-RNTI or a validity of a primary grant is set to be false, and an absolute grant value of the absolute grant is not a deactivation command, then:

setting, by the user equipment, a service grant to be a maximum value of the absolute grant value and a minimum configuration service grant value when the absolute grant value of the absolute grant is not a zero grant command; or, setting, by the user equipment, a service grant to be a zero grant when the absolute grant value of the absolute grant is a zero grant command.

6. A user equipment, comprising:

a transmitter, configured to report to a radio network controller a capability of the user equipment to support an uplink enhanced dedicated channel;

a receiver, configured to receive a configuration message transmitted by the radio network controller, wherein the configuration message carries an enhanced-radio network temporary identity (E-RNTI), wherein the E-RNTI comprises an E-RNTI allocated to a group to which the user equipment belongs, wherein the E-RNTI comprises a first E-RNTI and a primary E-RNTI, and wherein the E-RNTI allocated to the group to which the user equipment belongs is the first E-RNTI; and a processor, configured to monitor a first channel by using the E-RNTI carried in the configuration message which is received by the receiver, and activate or deactivate a hybrid automatic repeat request (HARQ) process according to an absolute grant received in the first channel;

wherein the transmitter reporting to a radio network controller the capability of the user equipment to support the uplink enhanced dedicated channel comprises: the transmitter reporting to the radio network controller a capability of the user equipment to support receiving an absolute grant that is identified as the first E-RNTI during an uplink enhanced dedicated channel operation.

7. The user equipment according to claim 6, wherein the processor is further configured to, before activating or deactivating the HARQ process, and when an absolute grant which is identified as the first E-RNTI or the primary E-RNTI is received in the first channel, determine a type of the absolute grant which is identified as the first E-RNTI or the primary E-RNTI to be a primary grant.

8. The user equipment according to claim 6, wherein activating or deactivating the HARQ process according to the absolute grant received in the first channel comprises:

when an identification of the absolute grant received in the first channel is the first E-RNTI, and an absolute grant value of the absolute grant is a deactivation command:

deactivating an HARQ process corresponding to an HARQ process number which is corresponding to a current transmission time interval (TTI) if an absolute grant scope of the absolute grant is per HARQ process and a 2 milliseconds TTI is configured; or, deactivating all HARQ processes if an absolute grant scope of the absolute grant is all HARQ processes and a 2 milliseconds TTI is configured but a secondary E-RNTI is not configured; or, activating all HARQ processes if an absolute grant scope of the absolute grant is all HARQ processes and a secondary E-RNTI is configured, set a service grant as storing a second grant value, and set a validity of a primary grant to be false.

9. The user equipment according to claim 6, wherein activating or deactivating the HARQ process according to the absolute grant received in the first channel comprises:

when an identification of the absolute grant received in the first channel is the first E-RNTI, and an absolute grant value of the absolute grant is not a deactivation command:

activating an HARQ process corresponding to an HARQ process number which is corresponding to a current transmission time interval (TTI), and deactivating all HARQ processes except the HARQ process corresponding to the HARQ process number which is corresponding to the current TTI.

10. The user equipment according to claim 6, wherein the processor is further configured to, when an identification of the absolute grant received in the first channel is the first E-RNTI, the primary E-RNTI or a validity of a primary grant is set to be false, and an absolute grant value of the absolute grant is not a deactivation command:

set a service grant to be a maximum value of the absolute grant value and a minimum configuration service grant value if the absolute grant value of the absolute grant is not a zero grant command; or, set a service grant to be a zero grant if the absolute grant value of the absolute grant is a zero grant command.

11. A method for group scheduling grant, comprising:

reporting, by a user equipment to a radio network controller, a capability of the user equipment to support an uplink enhanced dedicated channel;

receiving, by the user equipment, a configuration message transmitted by the radio network controller, wherein the configuration message carries an enhanced-radio network temporary identity (E-RNTI), wherein the E-RNTI comprises an E-RNTI allocated to a group to which the user equipment belongs; and monitoring, by the user equipment, a first channel by using the E-RNTI carried in the configuration message, and activating or deactivating a hybrid automatic repeat request (HARQ) process according to an absolute grant received by the user equipment in the first channel;

wherein the E-RNTI carried in the configuration message comprises a primary E-RNTI and a secondary E-RNTI, and the E-RNTI allocated to the group to which the user equipment belongs is the secondary E-RNTI.

* * * * *